United States Patent

Faust et al.

(10) Patent No.: US 6,882,441 B1
(45) Date of Patent: Apr. 19, 2005

(54) AUTOMATED TYPESETTING SYSTEM

(75) Inventors: Steven D. Faust, Lockport, IL (US); Daniel A. Fontana, Palos Park, IL (US); Joseph L. Fontana, Sr., Orland Park, IL (US); Jeffrey S. Gagne, Orland Park, IL (US)

(73) Assignee: On-Line Print Services, L.L.C., Northbrook, IL (US)

( * ) Notice: Subject to any disclaimer, the term of this patent is extended or adjusted under 35 U.S.C. 154(b) by 0 days.

(21) Appl. No.: 09/429,196

(22) Filed: Oct. 28, 1999

Related U.S. Application Data

(60) Provisional application No. 60/105,977, filed on Oct. 28, 1998.

(51) Int. Cl.[7] .............................................. G06F 15/00
(52) U.S. Cl. ................... 358/1.18; 358/1.12; 707/104.1
(58) Field of Search ........................ 358/1.18; 707/104, 707/517, 507, 508

(56) References Cited

U.S. PATENT DOCUMENTS

| | | | |
|---|---|---|---|
| 4,839,829 A | * | 6/1989 | Freedman .................... 101/248 |
| 5,991,739 A | * | 11/1999 | Cupps et al. .................. 705/26 |
| 6,064,397 A | * | 5/2000 | Herregods et al. .......... 345/630 |
| 6,650,433 B1 | * | 11/2003 | Keane et al. ............... 358/1.15 |

* cited by examiner

*Primary Examiner*—Edward Coles
*Assistant Examiner*—Alan Rahimi
(74) *Attorney, Agent, or Firm*—Kegan & Kegan, Ltd.; Marc E. Fineman

(57) ABSTRACT

An automated typesetting system is disclosed for use in the production of commercially-printed products, such as engraved, embossed, or lithographed letterhead, envelopes, business cards, and the like. The automated typesetting system is a computerized system for accurately and efficiently typesetting copy and includes a graphic template containing text and object blocks and a database containing information to be populated into the template blocks as well as instructions on how to format each of the blocks. Information from the database is optionally electronically proofchecked, populated into the template fields, formatted and typeset according to design specifications, arranged in maximally-efficient production format, and sent to print. The system may be interactively coupled with an order tracking, billing, shipping, and inventory control system.

9 Claims, 61 Drawing Sheets

INDIVIDUAL'S NAME        LEGAL ENTITY NAME
TITLELINE 1(IF REQUIRED) FIRST VERY LONG LINE OF ADDRESS
TITLELINE 2(IF REQUIRED) SECOND LINE OF ADDRESS
COMPANY (IF REQUIRED)    THIRD LINE OF ADDRESS WITH ZIP
TEL ☐☐☐ ☐☐☐ ☐☐☐          COUNTRY
FAX ☐☐☐ ☐☐☐ ☐☐☐
MOBILE ☐☐☐ ☐☐☐ ☐☐☐       INDIVIDUAL'S NAME
                         @xx.artherandersen.com

A MEMBER OF ANDERSEN WORLDWIDE SC

INDIVIDUAL'S NAME        LEGAL ENTITY NAME
TITLELINE 1(IF REQUIRED) FIRST VERY LONG LINE OF ADDRESS
TITLELINE 2(IF REQUIRED) SECOND LINE OF ADDRESS
COMPANY (IF REQUIRED)    THIRD LINE OF ADDRESS WITH ZIP
TEL ☐☐☐ ☐☐☐ ☐☐☐          COUNTRY
FAX ☐☐☐ ☐☐☐ ☐☐☐
MOBILE ☐☐☐ ☐☐☐ ☐☐☐       INDIVIDUAL'S NAME
                         @xx.artherandersen.com

A MEMBER OF ANDERSEN WORLDWIDE SC

INDIVIDUAL'S NAME        LEGAL ENTITY NAME
TITLELINE 1(IF REQUIRED) FIRST VERY LONG LINE OF ADDRESS
TITLELINE 2(IF REQUIRED) SECOND LINE OF ADDRESS
COMPANY (IF REQUIRED)    THIRD LINE OF ADDRESS WITH ZIP
TEL ☐☐☐ ☐☐☐ ☐☐☐          COUNTRY
FAX ☐☐☐ ☐☐☐ ☐☐☐
MOBILE ☐☐☐ ☐☐☐ ☐☐☐       INDIVIDUAL'S NAME
                         @xx.artherandersen.com

A MEMBER OF ANDERSEN WORLDWIDE SC

FIG. 2

| FIG. 7-1 |
|---|
| FIG. 7-2 |
| FIG. 7-3 |
| FIG. 7-4 |
| FIG. 7-5 |
| FIG. 7-6 |
| FIG. 7-7 |
| FIG. 7-8 |
| FIG. 7-9 |
| FIG. 7-10 |
| FIG. 7-11 |
| FIG. 7-12 |
| FIG. 7-13 |
| FIG. 7-14 |

FIG. 7

| Field Name | Field Type | Formula/Entry Option |
|---|---|---|
| Address1 | Text | Indexed |
| Address2 | Text | Indexed |
| Address3 | Text | Indexed |
| Address4 | Text | |
| AddressBlock | Calculation(Text) | = If(Title2 ≠ Empty, "¶", Empty) & If(Legal Entity ≠ Empty, AddressBlockEur, If(Sector Name ≠ Empty, Sector Name Calc & "¶", Empty) & If(███████ ≠ Empty, ███████ & "¶", Empty) & If(Group Name ≠ Empty, Group Name & "¶",Empty) & If(Address1 ≠ Empty, Address1 & "¶",Empty) & If(Address2 ≠ Empty, Addresas2 & "¶",Empty) & If(Address3 ≠ Empty, Address3 & "¶",Empty) & If(City ≠ Empty, City & ", " & " ",Empty) & If(State ≠ Empty, StateForAddressBlock & " ",Empty) & If(Zip Code ≠ Empty, Zip Code & "¶",Empty & "¶")& If(DirectDial ≠ Empty, "phone" & " " & DirectDial & "¶",Empty) & If( Fax ≠ Empty, "fax" & " " & Fax & "¶",Empty) & If(Mobile ≠ Empty, "cellular" & " " & Mobile & "¶",Empty) & If(Pager ≠ Empty, "pager" & " " & Pager & "¶",Empty) & If(Email ≠ Empty, Email. " " & "¶")) |
| AddressBlock for Large Label | Calculation(Text) | = Company Name & "¶" & Name & "¶" & If(Legal Entity ≠ Empty, AddressBlockEurLabels, If(Address1 ≠ Empty, Address1 & "¶", Empty) & If(Address2 ≠ Empty, Address2 & "¶", Empty) & If(Address3 ≠ Empty, Address3 & "¶",Empty) & If(City ≠ Empty, City & "," & " ",Empty) & If(State ≠ Empty, State & " ",Empty) & If(Zip Code ≠ Empty, Zip Code,Empty)) |
| AddressBlockEur | Calculation(Text) | = If(Legal Entity ≠ Empty, Legal Entity & "¶", Empty) & If(Sector Name ≠ Empty, Sector Name Calc & "¶", Empty) & If(███████ ≠ Empty, ███████ & "¶",Empty) & If(Group Name ≠ Empty, Group Name & "¶",Empty) & If(Address1 ≠ Empty, Address1 & "¶",Empty) & If(Address2 ≠ Empty, Addresas2 & "¶",Empty) & If(Address3 ≠ Empty, Address3 & "¶",Empty) & If(Address4 ≠ Empty, Address4 & "¶",Empty) & If(Zip Code ≠ Empty, Zip Code & "," & " ", Empty) & If(City ≠Empty, City & "," & " ",Empty) & If(Country ≠ Empty, Country & "¶",Empty) & If(DirectDial ≠ Empty, "tel" & " " & DirectDial & "¶",Empty) & If(Fax ≠ Empty, "fax" & " " & Fax & "¶",Empty) & If(Mobile ≠ Empty, "mobile" & " " & Mobile & "¶",Empty) & If(Pager ≠ Empty, "pager" & " " & Pager & "¶",Empty) & If(Email ≠ Empty, Email. " " & "¶") |
| AddressBlockEurLabels | Calculation(Text) | =If(Legal Entity ≠ Empty, Legal Entity & "¶",Empty) & |

FIG. 7-1

| Field Name | Field Type | Formula/Entry Option |
|---|---|---|
| | | If(Address1≠Empty , Address1 & "¶",Empty) & If(Address2≠ Empty , Addresss2 & "¶",Empty) & If(Address3 ≠ Empty, Address3 & "¶",Empty) & If(Zip Code ≠ Empty, Zip Code & "," & " ",Empty) & If(City ≠ Empty, City & "," & " ",Empty) & If(Countrty ≠ Empty, Country & "¶",Empty) |
| BCard01 | Calculation(Text) | ="open" & Quote & "███████████████████" & Quote & "¶" & <br>"measureunits 3,3, 10"&"¶"& <br>"select 16p5, 11p10"&"¶" & <br>"textedit"&"¶" & <br>"selectall" & "¶" & <br>If(Name ≠ Empty,"textenter" & Quote & NameTitle & Quote &"¶","textenter" & Quote & " " & Quote &"¶") & <br>"textcursor -textblock" & "¶" & <br>"textselect+eol" & "¶" & <br>"font" & Quote & "CorporateSBQ-Medium" & Quote &"¶" & <br>"select 17p7,16p7"&"¶" & <br>"textedit"&"¶" & <br>"selectall"&"¶" & <br>"textenter " & Quote & Trim(AddressBlock) & Quote & "¶" & <br>"textcursor -textblock" &"¶" & <br>"textselect+eol 2" &"¶" & <br>"font" & Quote & "CorporateSExpBQ-Medium" &Quote& "¶" & <br>"select 16p5, 11p10"&"¶" & <br>"textedit"&"¶"& <br>"selectall"&"¶"& <br>"textcursor-textblock"&"¶"& <br>"textselect+eol" & "¶"& <br>"Color" & Qoute&"PANTONE 471 CV"& Qoute&"¶" & <br>"select 17p7,16p7"&"¶" & <br>"textedit"&"¶"& <br>"selectall"&"¶"& <br>"textcursor-textblock"&"¶"& <br>"textselect+eol"2 & "¶" & <br>"Color" & Qoute &"PANTONE 471 CV" & Qoute&"¶" & <br>"select 16p5,11p10"&"¶" & <br>"textedit"&"¶"& <br>"textcursor+line"&"¶"& <br>"textselect+textblock"&"¶"& |

FIG. 7-2

| Field Name | Field Type | Formula/Entry Option |
|---|---|---|
| | | "Sizebump downone"&"¶"&<br>"select 16p5,11p10"&"¶"&<br>"textedit"&"¶"&<br>"selectall"&"¶"&<br>"KernText 0.025"&"¶"&<br>"select 17p7,16p7"&"¶" &<br>"textedit"&"¶" &<br>"selectall"&"¶" &<br>"KernText 0.025"&"¶"&<br>"select 17p7,16p7"&"¶" &<br>"textedit"&"¶" &<br>"textcursor +textblock" &"¶" &<br>"textselect-eol" &"¶" &<br>"font" & Quote & "CorporateSBQ-Regular" & Quote &"¶" &<br>"select 68p6,1p11"&"¶"&<br>"textedit"&"¶" &<br>"selectall"&"¶" &<br>"textenter"&Qoute&(PlateRefNum)&Qoute&"¶" |
| ▮▮▮▮▮ | Calculation(Text) | =If(Item Ordered="Business Cards",<br>"open" & Quote & "▮▮▮▮▮▮▮▮▮▮▮▮▮▮▮▮▮▮▮" &<br>Qoute &"¶"&<br>"measureunits 3,3, 10"&"¶"&<br>"select 16p5, 11p7"&"¶" &<br>"textedit"&"¶" &<br>"selectall" &"¶" &<br>If(Name ≠ Empty,"textenter" & Quote & Name Title & Quote<br>&"¶","textenter" & Quote & " " & Quote &"¶") &<br>"textcursor -textblock" &"¶" &<br>"textselect+eol" &"¶" &<br>"font" & Quote & "CorporateSBQ-Medium" & Quote &"¶" &<br>"select 17p5,16p3"&"¶" &<br>"textedit"&"¶" &<br>"selectall"&"¶" &<br>"textenter " & Quote & Trim(AddressBlock) & Quote & "¶"<br>,Empty)&<br>"textcursor -textblock" &"¶" &<br>"textselect+eol2" &"¶" &<br>"font" & Quote & "CorporateSBQ-Medium" & Quote &"¶" & |

FIG. 7-3

| Field Name | Field Type | Formula/Entry Option |
|---|---|---|
| | | "select 16p5,11p7"&"¶"& |
| | | "textedit"&"¶"& |
| | | "textcursor+line"&"¶"& |
| | | "textselect+textblock"&"¶"& |
| | | "Sizebump downone"&"¶"& |
| | | "select 17p5,16p3"&"¶"& |
| | | "textedit"&"¶"& |
| | | "selectall"&"¶"& |
| | | "KernText 0.025"&"¶"& |
| | | "select 16p5,11p7"&"¶"& |
| | | "textedit"&"¶"& |
| | | "selectall"&"¶"& |
| | | "KernText 0.025"&"¶"& |
| | | "select 17p5,16p3"&"¶" & |
| | | "textedit"&"¶" & |
| | | "textcursor +textblock" &"¶" & |
| | | "textselect - eol" &"¶" & |
| | | "font" & Quote & "CorporateSBQ-Regular" & Quote &"¶" & |
| | | "select 71p3,2p3"&"¶" & |
| | | "textedit"&"¶" & |
| | | "selectall"&"¶" & |
| | | "textenter " & Quote & (PlateRefNum)& Quote & "¶" |
| ■■■■■■ | Calculation(Text) | ="open"&Quote&"■■■■■■■■■■■■■■■■■■■■■■■■■■■■■■■■■■■■■■" &Qoute &"¶"& |
| | | "measureunits 3,3, 10"&"¶"& |
| | | "select 16p3, 11p3"&"¶" & |
| | | "textedit"&"¶" & |
| | | "selectall" &"¶" & |
| | | If(Name ≠ Empty,"textenter" & Quote & Name Title & Quote |
| | | &"¶","textenter" & Quote & " " & Quote &"¶" & |
| | | "textcursor -textblock" &"¶" & |
| | | "textselect+eol" &"¶" & |
| | | "font" & Quote & "CorporateSBQ-Medium" & Quote &"¶" & |
| | | "select 17p2,16p7"&"¶" & |
| | | "textedit"&"¶" & |
| | | "selectall"&"¶" & |
| | | "textenter " & Quote & Trim(AddressBlock) & Quote & "¶" & |
| | | "textcursor -textblock" &"¶" & |

FIG. 7-4

| Field Name | Field Type | Formula/Entry Option |
|---|---|---|
| | | "textselect+eol2" & "¶" & |
| | | "font" & Quote & "CorporateSExpBQ-Medium" & Quote &"¶" & |
| | | "select 16p3,11p3"&"¶" & |
| | | "textedit"&"¶" & |
| | | "selectall"&"¶" & |
| | | "textcursor -textblock" &"¶" & |
| | | "textselect+eol" &"¶" & |
| | | "Color"&Quote&"PANTONE 471CV"&Quote&"¶"& |
| | | "select 17p2,16p7"&"¶" & |
| | | "textedit"&"¶" & |
| | | "selectall"&"¶" & |
| | | "textcursor -textblock" &"¶" & |
| | | "textselect+eol2" &"¶" & |
| | | "Color"&Quote&"PANTONE 471CV"&Quote&"¶"& |
| | | "select 16p3,11p3"&"¶" & |
| | | "textedit"&"¶" & |
| | | "textcursor+line"&"¶"& |
| | | "textselect+textblock"&"¶"& |
| | | "Sizebump downone"&"¶"& |
| | | "select 16p3,11p3"&"¶"& |
| | | "textedit"&"¶"& |
| | | "selectall"&"¶"& |
| | | "KernText 0.025"&"¶"& |
| | | "select 17p2,16p7"&"¶"& |
| | | "textedit"&"¶"& |
| | | "selectall"&"¶"& |
| | | "KernText 0.025"&"¶"& |
| | | "select 17p2,16p7"&"¶" & |
| | | "textedit"&"¶" & |
| | | "textcursor +textblock" &"¶" & |
| | | "textselect - eol" &"¶" & |
| | | "font" & Quote & "CorporateSBQ-Regular" & Quote &"¶" & |
| | | "select 71p5,2p5"&"¶" & |
| | | "textedit"&"¶" & |
| | | "selectall"&"¶" & |
| | | "textenter" & Quote & (PlateRefNum)& Quote & "¶" |

FIG. 7-5

| Field Name | Field Type | Formula/Entry Option |
|---|---|---|
| ▬▬▬▬▬ | Calculation(Text) | =If (Item Ordered="Business Cards", "open"&Quote&" |

" & Qoute &"¶"&
"measureunits 3,3, 10"&"¶"&
"select 16p6, 10p7"&"¶" &
"textedit"&"¶" &
"selectall" &"¶" &
If(Name ≠ Empty,"textenter" & Quote & NameTitle & Quote
&"¶","textenter" & Quote & " " & Quote &"¶") &
"textcursor -textblock" &"¶" &
"textselect+eol" &"¶" &
"font" & Quote & "CorporateSBQ-Medium" & Quote &"¶" &
"select 17p6,15p7"&"¶" &
"textedit"&"¶" &
"selectall"&"¶" &
"textenter " & Quote & Trim(AddressBlock) & Quote & "¶" &
,Empty)&
"textcursor -textblock" &"¶" &
"textselect+eol"2 &"¶" &
"font" & Quote & "CorporateSExpBQ-Medium" & Quote &"¶" &
"select 16p6,10p7"&"¶"&
"textedit"&"¶"&
"textcursor+line"&"¶"&
"textselect+textblock"&"¶"&
"Sizebump downone"&"¶"&
"select 16p6,10p7"&"¶"&
"textedit"&"¶"&
"selectall"&"¶"&
"KernText 0.025"&"¶"&
"select 17p6,15p7"&"¶"&
"textedit"&"¶"&
"selectall"&"¶"&
"KernText 0.025"&"¶"&
"select 17p6,15p7"&"¶" &
"textedit"&"¶" &
"textcursor +textblock" &"¶" &
"textselect - eol" &"¶" &
"font" & Quote & "CorporateSBQ-Regular" & Quote &"¶" &
"select 72p2,1p8"&"¶" &

FIG. 7-6

| Field Name | Field Type | Formula/Entry Option |
|---|---|---|
| BCard02 | Calculation(Text) | "textedit"&"¶" &<br>"selectall"&"¶" &<br>"textenter " & Quote & (PlateRefNum) & Quote & "¶"<br>="measureunits 3,3, 10"&"¶"&<br>"select 16p10, 32p11"&"¶" &<br>"textedit"&"¶" &<br>"selectall" &"¶" &<br>If(Name ≠ Empty,"textenter" & Quote & Name Title & Quote<br>&"¶","textenter" & Quote & " " & Quote &"¶") &<br>"textcursor -textblock" &"¶" &<br>"textselect+eol" &"¶" &<br>"font" & Quote & "CorporateSBQ-Medium" & Quote &"¶" &<br>"select 17p6,37p10"&"¶" &<br>"textedit"&"¶" &<br>"selectall"&"¶" &<br>"textenter " & Quote & Trim(AddressBlock) & Quote & "¶" &<br>"textcursor -textblock" &"¶" &<br>"textselect+eol"2 &"¶" &<br>"font" & Quote & "CorporateSExpBQ-Medium" & Quote &"¶" &<br>"select 16p10,32p11"&"¶"&<br>"textedit"&"¶"&<br>"selectall"&"¶"&<br>"textcursor-textblock"&"¶"&<br>"textselect+eol" &"¶" &<br>"Color" & Quote & "PANTONE 471 CV" & Qoute & "¶" &<br>"select 17p6,37p10"&"¶"&<br>"textedit"&"¶"&<br>"selectall"&"¶"&<br>"textselect-textblock"&"¶"&<br>"textselect+eol 2" &"¶" &<br>"Color" & Quote & "PANTONE 471 CV" & Quote & "¶" &<br>"select 16p10,32p11"&"¶"&<br>"textedit"&"¶"&<br>"textcursor+line"&"¶"&<br>"textselect+textblock"&"¶"&<br>"Sizebump downone"&"¶"&<br>"select 17p6,37p7"&"¶"&<br>"textedit"&"¶"&<br>"selectall"&"¶"& |

FIG. 7-7

| Field Name | Field Type | Formula/Entry Option |
|---|---|---|
| | | "KernText 0.025"&"¶"&<br>"select 16p10,32p11"&"¶"&<br>"textedit"&"¶"&<br>"selectall"&"¶"&<br>"KernText 0.025"&"¶"&<br>"select 17p6,37p10"&"¶" &<br>"textedit"&"¶" &<br>"textcursor +textblock" &"¶" &<br>"textselect - eol" &"¶" &<br>"font" & Quote & "CorporateSBQ-Regular" & Quote &"¶" |
| ▋ | Calculation(Text) | ="measureunits 3,3, 10"&"¶"&<br>"select 16p7, 32p7"&"¶" &<br>"textedit"&"¶" &<br>"selectall" &"¶" &<br>If(Name ≠ Empty,"textenter" & Quote & Name Title & Quote<br>&"¶","textenter" & Quote & " " & Quote &"¶") &<br>"textcursor -textblock" &"¶" &<br>"textselect+eol" &"¶" &<br>"font" & Quote & "CorporateSBQ-Medium" & Quote &"¶" &<br>"select 16p9,37p1"&"¶" &<br>"textedit"&"¶" &<br>"selectall"&"¶" &<br>"textenter " & Quote & Trim(AddressBlock) & Quote & "¶" &<br>"textcursor -textblock" &"¶" &<br>"textselect+eol"2 &"¶" &<br>"font" & Quote & "CorporateSExpBQ-Medium" & Quote &"¶" &<br>"select 16p7,32p7"&"¶"&<br>"textedit"&"¶"&<br>"textcursor+line"&"¶"&<br>"textselect+textblock"&"¶"&<br>"Sizebump downone"&"¶"&<br>"select 16p9,37p1"&"¶"&<br>"textedit"&"¶"&<br>"selectall"&"¶"&<br>"KernText 0.025"&"¶"&<br>"select 16p7,37p1"&"¶"&<br>"textedit"&"¶"&<br>"selectall"&"¶"& |

FIG. 7-8

| Field Name | Field Type | Formula/Entry Option |
|---|---|---|
| | | "KernText 0.025"&"¶"& |
| | | "select16p9,37p1"&"¶"& |
| | | "textedit"&"¶"& |
| | | "textcursor +textblock" &"¶") & |
| | | "textselect - eol" &"¶"& |
| | | "textselect+eol"2 &"¶"& |
| | | "Color"&Quote&"PANTONE 471CV"&Quote&"¶"& |
| | | "select64p11,95p1"&"¶"& |
| | | "textedit"&"¶"& |
| | | "textcursor+line"&"¶"& |
| | | "textselect+textblock"&"¶"& |
| | | "Sizebump downone"&"¶"& |
| | | "select 65p2,99p4"&"¶"& |
| | | "textedit"&"¶"& |
| | | "selectall"&"¶"& |
| | | "KernText 0.025"&"¶"& |
| | | "select 64p11,95p1"&"¶"& |
| | | "textedit"&"¶"& |
| | | "selectall"&"¶"& |
| | | "KernText 0.025"&"¶"& |
| | | "select65p2,99p4"&"¶" & |
| | | "textedit"&"¶" & |
| | | "textcursor +textblock" &"¶") & |
| | | "textselect - eol" &"¶" & |
| | | "font" & Quote & "CorporateSBQ-Medium" & Quote &"¶" & |
| ▬ | Calculation(Text) | |
| | | ="measureunits 3,3, 10"&"¶" |
| | | "select 64p9, 94p8"&"¶" & |
| | | "textedit"&"¶" & |
| | | "selectall" &"¶" & |
| | | If(Name ≠ Empty,"textenter" & Quote & Name Title & Quote &"¶","textenter" & Quote & " " & Quote &"¶") & |
| | | "textcursor -textblock" &"¶") & |
| | | "textselect+eol" &"¶" & |
| | | "font" & Quote & "CorporateSBQ-Medium" & Quote &"¶" & |
| | | "select65p6,99p7"&"¶" & |
| | | "textedit"&"¶" & |
| | | "selectall"&"¶" & |
| | | "textenter " & Quote & Trim(AddressBlock) & Quote & "¶" & |
| | | "textcursor -textblock" &"¶") |

FIG. 7-9

| Field Name | Field Type | Formula/Entry Option |
|---|---|---|
| | | "textselect+eol"2 &"¶" & |
| | | "font" & Quote & "CorporateSExpBQ-Medium" & Quote &"¶" & |
| | | "select 64p9,94p8"&"¶"& |
| | | "textedit"&"¶"& |
| | | "textcursor+line"&"¶"& |
| | | "textselect+textblock"&"¶"& |
| | | "Sizebump downone"&"¶"& |
| | | "select 65p6,99p7"&"¶"& |
| | | "textedit"&"¶"& |
| | | "selectall"&"¶"& |
| | | "KernText 0.025"&"¶"& |
| | | "select 64p9,94p8"&"¶"& |
| | | "textedit"&"¶"& |
| | | "selectall"&"¶"& |
| | | "KernText 0.025"&"¶"& |
| | | "select 65p6,99p7"&"¶" & |
| | | "textedit"&"¶" & |
| | | "textcursor +textblock" &"¶" & |
| | | "textselect - eol" &"¶" & |
| | | "font" & Quote & "CorporateSBQ-Regular" & Quote &"¶" & |
| City | Text | Indexed |
| Company Name | Calculation(Text) | Indexed |
| | | =If(Sector Name="▮▮▮▮",Sector Name,If(Sector Name= "▮▮▮▮▮▮▮▮",Sector Name,If(Sector Name="▮▮▮▮▮",Sector Name,"▮▮▮▮▮▮▮"))) |
| Country | Text | Indexed |
| Date Created | Date | Auto-enter the:"Creation Date" |
| | | Prevent data that is automatically entered from being changed. |
| | | Indexed |
| Date Modified | Date | Auto-enter the:"Modification Date" |
| | | Prevent data that is automatically entered from being changed |
| DirectDial | Text | |
| DupYesNo | Text | |
| Email | Text | Indexed |
| emailcalc | Calculation(Text) | =If(Length(Email)>32,"too many characters",Empty) |
| EmailInstractions | Text | |

FIG. 7-10

| Field Name | Field Type | Formula/Entry Option |
|---|---|---|
| Empty | Text | |
| FAEC Comments | Text | Indexed |
| Fax | Text | |
| Group Name | Text | Indexed |
| InternationalCode | Text | |
| IPAddress | Text | |
| Item Ordered | Text | Auto-enter:"Business Cards" Repeating field with 3 repetitions |
| Job Ticket | Text | |
| Legal Entitiy | Text | Indexed |
| Local Code | Text | |
| Mobile | Text | Indexed |
| Name | Text | Indexed |
| Name Title | Calculation(Text) | =Name&"¶"& Title&"¶"& Title2&"¶" |
| NewPlateNum | Number | Auto-enter:"26" |
| Pager | Text | |
| PlateRefNum | Text | Indexed |
| Quantity Ordered | Number | Auto-enter:"250" Indexed |
| Quote | Calculation(Text) | ="" |
| Record Modified | Text | Auto-enter calculation=If(IsEmpty(FAEC Comments),"","x") |
| Record Number | Number | Serial Number with Current Value:"▓" Increment:"1" Prevent data that is automatically entered from being changed. Indexed |
| Sector Name | Text | Indexed |
| Sector Name Calc | Calculation(Text) | =If(Sector Name="▓","▓",If(Legal Entitiy ≠ Empty and Sector Name ▓ Empty, Sector Name)) |
| SenttoFilm | Text | Auto-enter:"No" Value List(Custom Values): Yes |

FIG. 7-11

| Field Name | Field Type | Formula/Entry Option |
|---|---|---|
| | | No Indexed |
| SenttoFilmDate | Date | Indexed |
| ShipAddress | Text | Indexed |
| ShipAddressCalc | Calculation(Text) | Indexed<br>=If(ShipSameAsOrder="Yes",Address1&""&Address2 &""& Address3,ShipAddress) |
| ShipCity | Text | Indexed |
| ShipCityCalc | Calculation(Text) | Indexed<br>=If(ShipSameAsOrder="Yes",City,ShipCity) |
| ShipCountry | Text | |
| ShipCountryCalc | Calculation(Text) | Indexed<br>=If(ShipSameAsOrder="Yes",Country,ShipCountry) |
| ShipName | Text | Indexed |
| ShipNameCalc | Calculation(Text) | Indexed<br>=If(ShipSameAsOrder="Yes",Name,ShipName) |
| ShipSameAsOrder | Text | Indexed |
| ShipState | Text | Indexed |
| ShipStateCalc | Calculation(Text) | Indexed<br>=If(ShipSameOrder="Yes",State,ShipState) |
| ShipZip | Text | |
| ShipZipCalc | Calculation(Text) | Indexed<br>=If(ShipSameAsOrder="Yes",Zip Code,ShipZip) |
| SpareDate1 | Date | |
| SpareDate2 | Date | |
| SpareGlobalContain | Global(Container) | |
| SpareGlobalDate | Global(Date) | |
| SpareGlobalNum | Global(Number) | |
| SpareGlobalText | Global(Text) | |
| SpareGlobalTime | Global(Time) | |
| SpareNum2 | Number | |
| SpareText1 | Text | |
| SpareText2 | Text | |
| SpareTime1 | Time | |
| SpareTime2 | Time | |
| Special Instructions | Text | Indexed |
| State | Text | Indexed |
| StateCalc | Calculation(Text) | =If(State="AL","Alabama",If(State="AK","Alaska",If(State="AZ", |

FIG. 7-12

| Field Name | Field Type | Formula/Entry Option |
|---|---|---|
| | | "Arizona",If(State="AR","Arkansas",If(State="CA","California", If(State="CO","Colorado",If(State="CT","Connecticut",If(State= "DE","Delaware",If(State="FL","Florida",If(State="GA","Georgia", If(State="HI","Hawaii",If(State="ID","Idaho",If(State="IL","Illinois", If(State="IN","Indiana",If(State="IA","Iowa",If(State="KS", "Kansas",If(State="KY","Kentucky",If(State="LA","Louisiana", If(State="ME","Maine",If(State="MD","Maryland",If(State="MA", "Massachusetts",If(State="MI","Michigan",If(State="MN" "Minnesota",If(State="MS","Mississippi",If(State="MO","Missouri", If(State="MT","Montana",If(State="NE","Nebraska",If(State="NV" "Nevada",If(State="NH","New Hampshire",If(State="NJ","New Jersey",If(State="NM","New Mexico",If(State="NY","New York", If(State="NC","North Carolina",If(State="ND","North Dakota", If(State="OH","Ohio"If(State="OK","Oklahoma",If(State="OR", "Oregon",If(State="PA","Pennsylvania",If(State="RI","Rhode Island",If(State="SC","South Carolina",If(State="SD","South Dakota",If(State="TN","Tennessee",If(State="TX","Texas",If(State ="UT","Utah",If(State="VT","Vermont",If(State="VA","Virginia", If(State="DC","Washington DC",If(State="WA","Washington", If(State="WV","West Virginia",If(State="WI","Wisconcin",If(State= "WY","Wyoming",Empty)))))))))))))))))))))))))))))))))))))))))))))))))) |
| StateforAddressBlock | Calculation(Text) | =If(StateCalc ≠ Empty, StateCalc,State) |
| Tagline Translation | Text | Auto-enter:"Include Tag line in English" |
| TaglineTranslationLanguage | Text | |
| TimeCreated | Time | Auto-enter the:"Creation Time" Prevent data that is automatically entered from being changed. |
| Title | Text | |
| Title2 | Text | Indexed |
| Title Instructions | Text | |
| Translation Faxnumber | Text | |
| Translation Language | Text | Indexed |
| Translation needed? | Text | Auto-enter:"English only" Indexed |
| UserInputInitials | Text | |
| UserModifiedInititals | Text | |
| View Record Number | Number | Indexed |
| Void | Text | Value List(Custom Values): |

FIG. 7-13

| Field Name | Field Type | Formula/Entry Option |
|---|---|---|
|  |  | OK |
|  |  | Void |
|  |  | Manual Type |
|  |  | Follow up |
|  |  | ReRun |
|  |  | Translation Done |
|  |  | Indexed |
| Webaddress | Text |  |
| Zip Code | Text | Indexed |

FIG. 7-14

```
<!DOCTYPE HTML PUBLIC"-//IETF//DTD HTML//EN">
<html>

<head>
<meta http-equiv="Content-Type"
content="text/html; charset=iso-8859-1">
<meta name="GENERATOR"content="Microsoft FrontPage2.0">
<title>█████████</title>
</head>

<body background="images/background.gif" bgcolor="#FFFFFF">

<h1 align="center">█████████</h1>

<p><br>
</p>

<h2 align="center">All fields with gold arrows(<img
src="images/arrow_gold.gif" align="top" width="10" height="16">)
are required.<br>
Other items are optional.</h2>

<CENTER>
<TABLE BODER=0CELLPADDING=15><TR><TH BGCOLOR="#CCCCCC">
<FONT COLOR="#FF0000">
Type in upper and lower case.<BR>DO NOT TYPE IN ALL CAPS.
</FONT>
</TH></TR></TABLE>
</CENTER>

<hr size=1>

<form action="FMPro" method="POST">
    <input type="hidden" name="-db" value"█████">
    <input tyoe="hidden" name="-format" value="█████████">
    <input type="hidden" name="-error" value="gb_err.htm">
    <input type="hidden" name="-lay" value="Order Form">

<!--TABLE ORDER START-->
```

FIG. 8-1

```
<TABLE BORDER=0 CELLPADDING=3 CELLBORDER=0 CELLSPACING=1>

<TR>
<TD VALIGN=TOP ALIGN=RIGHT></TD>
<TD VALIGN=TOP COLSPAN=2>
 <b>Ordering Info:</b>
</TD>

</TR><TR>

<TD VALIGN=TOP ALIGN=RIGHT><img src="images/arrow_gold.gif" align="top"
width="7" height="11"></TD>
<TD VALIGN=TOP>Item Ordered:</TD>
<TD VALIGN=TOP><input type="checkbox" checked name="Item Ordered"
value="Business Cards">Business Cards</TD>

</TR><TR>

<TD VALIGN=TOP ALIGN=RIGHT><img src="images/arrow_gold.gif" align="top"
width="7" height="11"></TD>
<TD VALIGN=TOP>Quantity Ordered:</TD>
<TD VALIGN=TOP>
<input type="radio" checked name="Quantity Ordered" value="250">250 @
   ▇▇▇+ taxes and shipping.<BR>
<input type="radio" checked name="Quantity Ordered" value="500">500@
   ▇▇▇+ taxes and shipping.<BR>
<input type="radio" checked name="Quantity Ordered" value="1000">1000@
   ▇▇▇+ taxes and shipping.<BR>
<input type="radio" name="Quantity Ordered" value="Other">Other(Please order in units of
500)<BR>
```

If Other,please specify:

`<input type="text" size=10 name="Quantitiy Ordered">`

```
<BR>
(Additional charges will apply for special instructions and translation).<BR>
<PRE><BR></PRE>
```

<TD ALIGN=RIGHT><img src="images/arrow_gold.gif" align="top" width="7"
height="11"></TD>
<TD>Name(First Middle Last):</TD>
<TD><input type="text" size="30" maxlength="30" name="Name"></TD>

</TR><TR>

<TD></TD>
<TD>Title Line1:</TD>
<TD><input type="text" size="30" maxlength="30" name="Title"> (see * below)</TD>

</TR><TR>

<TD></TD>
<TD>Title Line2:</TD>
<TD><input type="text" size="30" maxlength="30" name="Title2"></TD>

</TR><TR>

<TD></TD>
<TD COLSPAN=2>
    <blockquote>
        <p>█████████████████████████
████████████████████████████████████
████████████████████████████████████
████████████████████████████████</p>
    </blockquote>
</TD>

```
<TD><img src="images/arrow_gold.gif align="top" width="7" height="11"></TD>
<TD>Organizational Name:</TD>
<TD><input type="text" size="40" name="Sector Name" value="█████
███"></TD>

</TR><TR>

<TD></TD>
<TD>Group Name:</TD>
<TD><input type="text" size="40" name="Group Name" value=""</TD>
</TR><TR>

<TD><img src="images/arrow_gold.gif" align="top" width="7" height="11"></TD>
<TD>Address Line1:</TD>
<TD><input type="text" size="30" maxlength="30" name="Address1"</TD>

</TR><TR>

<TD></TD>
<TD>Address Line2:</TD>
<TD><input type="text" size="30" maxlength="30" name="Address2"</TD>

</TR><TR>

<TD></TD>
<TD>Address Line3:</TD>
<TD><input type="text" size="30" maxlength="30" name="Address3"</TD>

</TR><TR>

<TD><img src="images/arrow_gold.gif" align="top" width="7" height="11"></TD>
<TD>City:</TD>
<TD><input type="text" size="30" name="City"></TD>

</TR><TR>

<TD><img src="images/arrow_gold.gif" align="top" width="7" height="11"></TD>
<TD>State:</TD>
<TD><input type="text" size="25" name="State"></TD>

```
<TD><img src="images/arrow_gold.gif" align="top" width="7" height="11"></TD>
<TD>ZipCode:</TD>
<TD><input type="text" size="24" name="ZipCode"></TD>

</TR><TR>

<TD><img src="images/arrow_gold.gif" align="top" width="7" height="11"></TD>
<TD>Phone:</TD>
<TD><input type="text" size="24" name="DirectDial"></TD>

</TR><TR>

<TD></TD>
<TD>Fax:</TD>
<TD><input type="text" size="24" name="Fax"></TD>

</TR><TR>

<TD></TD>
<TD>Mobile:</TD>
<TD><input type="text" size="25" name="Mobile"></TD>

</TR><TR>

<TD></TD>
<TD>Pager:</TD>
<TD><input type="text" size="24" name="Pager"></TD>

</TR><TR>

<TD></TD>
<TD>Email Address:</TD>
<TD><input type="text" size="50" name="Email"><BR>(see ** below)</TD>

</TR><TR>
```

FIG. 8-5

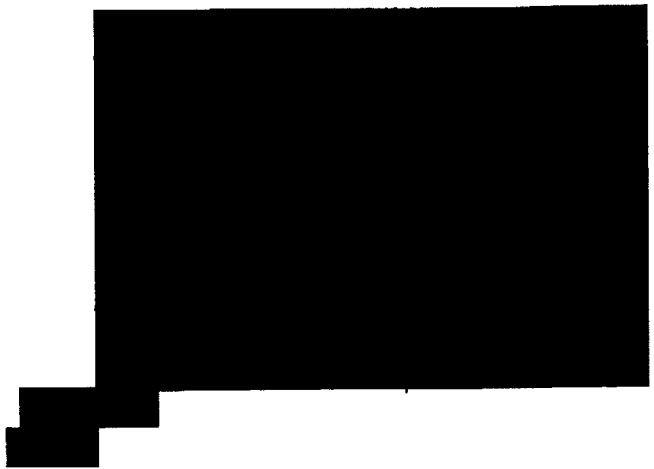

```
</TR><TR>

<TD COLSPAN=3>
<hr size=1>
</TD>

</TR><TR>

<TD></TD
<TD COLSPAN=2><b>Translation and back of card Info:</b></TD>

</TR><TR>

<TD></TD>
<TD COLSPAN=2>Font of Card Language</TD>
<TR></TR>
<TD></TD>

<TD COLSPAN=2>
<input type="radio" name="TranslationFrontDummy" value="english" checked>
Produce as typed.<BR>
<input type="radio" name="TranslationFrontDummy" value="other">Translation needed in
<input type="text" size="20" name="Translation Language"> language.<BR>
<IMG SRC="./images/blank.gif" WIDTH=18 HEIGHT=2 BORDER=0>
(Note: Translation only will be faxed to you for approval.)
<PRE><BR></PRE>
</TD>

```
<TD></TD>
<TD COLSPAN=2>Back of Card Language(Optional)</TD>

</TR><TR>

<TD></TD>
<TD COLSPAN=2>
<input type="radio" name="TranslationBackDummy" value="english" checked>
Produce as typed.<BR>
<input type="radio" name="TranslationBackDummy" value="other">Translation
needed in
<input type="text" size="20" name="Translation Back Language"> language.<BR>
<IMG SRC="./images/blank.gif" WIDTH=18 Height=2 Border=0>
(Note: Translation only will be faxed to you for approval.)
<PRE><BR></PRE>
</TD>

</TR><TR>

<TD></TD>
<TD COLSPAN=2>Back of Card Information(Optional)</TD>

</TR><TR>

<TD></TD>
<TD COLSPAN=2><TEXTAREA NAME="Back of Card Info" ROWS=10,
COLS=50></TEXTAREA>
</TD>

</TR><TR>

<TD COLSPAN=3><hr size=1></TD>

</TR><TR

<TD></TD>
<TD COLSPAN=2>Special Instructions:</TD>

```
<TD></TD>
<TD COLSPAN=2><input type="text" size="70" name="Special Instructions"></TD>

</TR><TR>
<TD COLSPAN=3><hr size=1></TD>

</TR><TR>

<TD></TD>
<TD COLSPAN=2><b>Shipping Info:</b></TD>

</TR><TR>

<TD></TD>
<TD COLSPAN=2><b>Is shipping info same as order info?:</b></TD>

</TR><TR>

<TD></TD>
<TD COLSPAN=2><input type="radio" checked name="ShipSameAsOrder" value="Yes">
Yes
<input type="radio" name="ShipSameAsOrder" value="No">No<BR>
<b><BR>"If no, Please fill out information below."</b></TD>

</TR><TR>

<TD><img src="images/arrow_gold.gif" align="top" width="7" height="11"></TD>
<TD>Ship To Name:</TD>
<TD><input type="text" size="50" name="ShipName"></TD>

</TR><TR>

<TD><img src="images/arrow_gold.gif" align="top" width="7" height="11"></TD>
<TD>Ship Address:</TD>
<TD><input type="text" size="60" name="ShipAddress"></TD>

</TR><TR>

<TD><img src="images/arrow_gold.gif" align="top" width="7" height="11"></TD>
<TD>Ship City:</TD>
<TD><input type="text" size="30" name="ShipCity"></TD>
```

<TD><img src="images/arrow_gold.gif" align="top" width="7" height="11"></TD>
<TD>Ship State:</TD>
<TD><input type="text" size="3" name="ShipState"></TD>

</TR><TR>
<TD><img src="images/arrow_gold.gif" align="top" width="7" height="11"></TD>
<TD>Ship Zip Code:</TD>
<TD><input type="text" size="11" name="ShipZip"></TD>

</TR><TR>

<TD COLSPAN=3><hr size=1></TD>

</TR><TR>

<TD></TD>

<TD COLSPAN=2><b>Billing Info:A request for your billing information will be sent to you shortly.</b></TD>

</TR><TR>

<TD COLSPAN=3><hr size=1></TD>

</TR><TR>

<TD></TD>
<TD COLSPAN=2>
<input type="submit" name="-new" value="Verify Order">   
<input type="reset" value="Clear Form">
</TD>

</TR></TABLE>

</form>
```

FIG. 8-9

```
</body>
</html>
```

FIG. 8-10

```
tell application "FileMaker Pro"
    activate
    open "Set the path name to the file you are opening"
    do script FileMaker script "Type name of script here"
end tell tell application "Finder"
    if exists file "Set Path and File Name" then
        tell application "Finder"
            activate
            select file "File Name goes here" of folder "Set Folder Path" of startup disk
            open selection
        end tell
        tell application "FileMaker Pro"
            activate
            do script FileMaker script "Name of Import Script" of window "Set File maker Pro File Name
        end tell
    end if
end tell
```

FIG. 9

| Script Step/Options | Script Parameters |
|---|---|
| Copy<br>　Select entire contents | SpareGlobalNum |
| Import Records<br>　Restore import order<br>　No dialog | Filename:"▮▮▮▮▮▮"(Administration)<br>Import Order:<br>　Date Created　(Date)<br>　Date Modified　(Date)<br>　Record Number　(Number)<br>　Name (Text)<br>　Email (Text)<br>　Title　(Text)<br>　Address1　(Text)<br>　State (Text)<br>　Zip Code　(Text)<br>　Country　(Text)<br>　DirectDial　(Text)<br>　Time Created　(Time)<br>　City　(Text)<br>　Item Ordered　(Text)<br>　Quantity Oredred　(Text)<br>　Webaddress　(Text)<br>　Address2　(Text)<br>　Title2 (Text)<br>　Fax　(Text)<br>　Pager (Text)<br>　Empty (Text)<br>　Translation needed?　(Text)<br>　Translation Language　(Text)<br>　Sector Name　(Text)<br>　ShipName　(Text)<br>　ShipAddress　(Text)<br>　ShipCity　(Text)<br>　ShipState　(Text)<br>　ShipZip　(Text)<br>　ShipSameAsOrder　(Text)<br>　IPAddress　(Text)<br>　LegalEntity　(Text)<br>　Mobile(Text)<br>　ShipCountry　(Text) |

FIG. 10-1

| Script Step/Options | Script Parameters |
|---|---|
| | View Record Number (Number) |
| | Tagline Translation (Text) |
| | Tagline Translation Language (Text) |
| | TitleInstructions (Text) |
| | EmailInstructions (Text) |
| | Special Instructions (Text) |
| | SpareNum2 (Number) |
| | SpareGlobalText (Text) |
| | SpareGlobalNum (Number) |
| | SpareGlobalDate (Date) |
| | SpareGlobalTime (Time) |
| | SpareDate1 (Date) |
| | SpareDate2 (Date) |
| | SpareTime1 (Time) |
| | SpareTime2 (Time) |
| | Translation Faxnumber (Text) |
| | Address3 (Text) |
| | Group Name (Text) |
| | ▬▬▬▬▬ (Text) |
| | FAEC Comments (Text) |
| | Record Modified (Text) |
| | SenttoFilm (Text) |
| | SenttoFilmDate (Date) |
| | UserInputInitials (Text) |
| | UserModifiedInitials (Text) |
| | JobTicket (Text) |
| | PlateRefNum (Text) |
| | Address4 (Text) |
| | InternationalCode (Text) |
| | LocalCode (Text) |
| | SpareText1 (Text) |
| | SpareText2 (Text) |
| GO to Record/Request/Page | |
|   First | |
| Loop | |
| If | Calculation |
| |   Quantitiy Ordered="500" |
| Set Field | Quantity Ordered |

FIG. 10-2

| Script Step/Options | Script Parameters |
|---|---|
| | Calculation<br>"250" |
| Duplicate Record/Request | |
| Goto Record/Request/Page<br>  First | |
| Else<br>If | Calculation<br>  Quantity Ordered="1000" |
| Set Field | Quantity Ordered<br>Calculation<br>"250" |
| Duplicate Record/Request | |
| Duplicate Record/Request | |
| Duplicate Record/Request | |
| Go to Record/Request/Page<br>  First | |
| Else | |
| Go to Record/Request/Page<br>  Next<br>  Exit after last | |
| End If | |
| End If | |
| End Loop | |
| Paste<br>  Select entire contents | SpareGlobalNum |
| If | Calculation<br>  Status(CurrentFoundCount) ≠ 25 |

FIG. 10-3

| Script Step/Options | Script Parameters |
|---|---|
| New Record/Request | |
| Set Field | Name<br>Calculation<br>   "Dummy Record" |
| Set Field | Address1<br>Calculation<br>   "Dummy Record" |
| Go to Record/Request/Page<br>  First | |
| End If | |
| If | Calculation<br>  Sector Name="▮▮▮" or Sector Name="▮▮▮"<br>  or Sector Name="▮▮▮" or Sector Name=<br>"▮▮▮" or Sector Name="▮▮▮"<br>" or Sector Name="▮▮▮" or<br>Sector Name="▮▮▮" or Sector Name=<br>"▮▮▮" or Sector Name="▮▮▮"<br>" or Sector Name= Empty |
| Perform Script<br>  Sub-scripts | ▮▮▮ |
| Else | |
| If | Calculation<br>  Sector Name=▮▮▮ |
| Perform Script<br>  Sub-scripts | ▮▮▮ |
| Else | |
| If | Calculation<br>  Sector Name="▮▮▮ |
| Perform Script | ▮▮▮ |

FIG. 10-4

| Script Step/Options | Script Parameters |
|---|---|
| Sub-scripts | |
| Else | |
| If | Calculation<br>Sector Name="█████" |
| Perform Script<br>Sub-scripts | ███████ |
| End If | |
| End If | |
| End If | |
| End If | |
| Find All | |

FIG. 10-5

```
Go to Layout [" Quick Find "]
Enter Find Mode []
Set Field [" SentToFilm ", " "=" "]
Set Field [" ItemOrdered ", " "Business Cards" "]
Set Field [" RecordStatus ", " "OK" "]
Set Field [BillToNum ", " "0157acsc" "]
Paste Literal [Select, "CreationDate", " <= "]
Paste Current Date [" CreationDate"]
Perform Find [ ]
If [" Status(CurrentFoundCount) = 0 "]
    Perform Script [Sub-scripts, "FindforLithoTypeset Part 2 "]
Else
End if
Loop
    If [" Qty = 250 or Qty = 100 "]
    Else
        If [" Qty = 500 "]
            Set Field [" SpareText5 ", " Qty "]
            Set Field [" Qty ", " 250 "]
            Duplicate Record/Request
            Set Field [" JobTicket ", " "Dummy" "]
            Go to Record/Request/Page [First]
        Else
            If [" Qty = 1000 "]
                Set Field [" SpareText5 ", " Qty "]
                Set Field ["Qty","250"]
                Duplicate Record/Request
                Set Field [" JobTicket ", " "Dummy" "]
                Duplicate Record/Request
                Duplicate Record/Request
                Duplicate Record/Request
                Set Field [" JobTicket ", " "Dummy" "]
                Duplicate Record/Request
                Duplicate Record/Request
                Go to Record/Request/Page [First]
            End If
        End If
    End If
End Loop
If    [" Status(CurrentFoundCount) = 6 or Status(CurrentFoundCount):
```

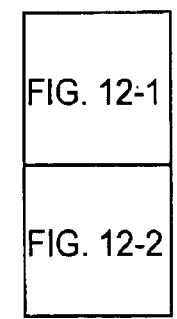

```
        Pause/Resume Script [ ]
        Go to Record/Request/Page [First]
        Perform Script [Sub-scripts , " Create Litho BCard Job Ticket " ]
Else
   Perform Script [Sub-scripts , " FindforLithoTypeset Part 2 " ]
End If
```

FIG. 12-2

| Script Step/ Options | Script Parameters |
| --- | --- |
| Go to Record/Request/Page<br>  First | |
| Set Field | PlateRefNum<br>Calculation<br>  If(Sector Name="▓▓▓▓▓",SpareGlobalNum+1&<br>  "▓▓▓▓▓",SpareGlobalNum+1) |
| Set Field | SenttoFilmDate<br>Calculation<br>  Today |
| Send Apple Event | Event Specification:<br>  Application:Adobe®PageMaker®6.5<br>  Event Class:misc<br>  Event ID:dosc<br>  Field:BCard01<br>  Wait for reply<br>  Bring application to foreground |
| Go to Record/Request/Page<br>  Next | |
| Set Field | PlateRefNum<br>Calculation<br>  If(Sector Name="▓▓▓▓▓",SpareGlobalNum+1&<br>  "▓▓▓▓▓",SpareGlobalNum+1) |
| Set Field | SenttoFilmDate<br>Calculation<br>  Today |
| Send Apple Event | Event Specification:<br>  Application:Adobe®PageMaker®6.5<br>  Event Class:misc<br>  Event ID:dosc<br>  Field:BCard02<br>  Wait for reply<br>  Bring application to foreground |
| Go to Record/Request/Page<br>  Next | |
| Set Field | PlateRefNum<br>Calculation |

FIG. 13-1

| Script Step/Options | Script Parameters |
|---|---|
| | If(Sector Name="▆▆▆▆▆",SpareGlobalNum+1& ▆▆▆▆▆",SpareGlobalNum+1) |
| Set Field | SenttoFilmDate<br>Calculation<br>   Today |
| Send Apple Event | Event Specification:<br>   Application:Adobe®PageMaker®6.5<br>   Event Class:misc<br>   Event ID:dosc<br>   Field:BCard03<br>   Wait for reply<br>   Bring application to foreground |
| Go to Record/Request/Page<br>  Next | |
| Set Field | PlateRefNum<br>Calculation<br>   If(Sector Name="▆▆▆▆▆",SpareGlobalNum+1&<br>   ▆▆▆▆▆",SpareGlobalNum+1)<br>SenttoFilmDate<br>Calculation<br>   Today |
| Send Apple Event | Event Specification:<br>   Application:Adobe®PageMaker®6.5<br>   Event Class:misc<br>   Event ID:dosc<br>   Field:BCard04<br>   Wait for reply<br>   Bring application to foreground |
| Go to Record/Request/Page<br>  Next | |
| Set Field | PlateRefNum<br>Calculation<br>   If(Sector Name="▆▆▆▆▆",SpareGlobalNum+1&<br>   ▆▆▆▆▆",SpareGlobalNum+1) |
| Set Field | SenttoFilmDate<br>Calculation<br>   Today |

FIG. 13-2

| Script Step/Options | Script Parameters |
|---|---|
| Send Apple Event | Event Specification:<br>    Application:Adobe PageMaker ®6.5<br>    Event Class:misc<br>    Event ID:dosc<br>    Field:BCard05<br>    Wait for reply<br>    Bring application to foreground |
| Go to Record/Request/Page<br>  Next | |
| Set Field | PlateRefNum<br>Calculation<br>    If(Sector Name="■■■■■",SpareGlobalNum+1&<br>    ■■■■■",SpareGlobalNum+1) |
| Set Field | SenttoFilmDate<br>Calculation<br>    Today |
| Send Apple Event | Event Specification:<br>    Application:Adobe®PageMaker ®6.5<br>    Event Class:misc<br>    Event ID:dosc<br>    Field:BCard06<br>    Wait for reply<br>    Bring application to foreground |
| Go to Record/Request/Page<br>  Next | |
| Set Field | PlateRefNum<br>Calculation<br>    If(Sector Name="■■■■■",SpareGlobalNum+1&<br>    ■■■■■",SpareGlobalNum+1) |
| Set Field | SenttoFilmDate<br>Calculation<br>    Today |
| Send Apple Event | Event Specification:<br>    Application:Adobe®PageMaker ®6.5<br>    Event Class:misc<br>    Event ID:dosc<br>    Field:BCard07 |

FIG. 13-3

| Script Step/Options | Script Parameters |
|---|---|
| | Wait for reply |
| | Bring application to foreground |
| Go to Record/Request/Page | |
|   Next | |
| Set Field | PlateRefNum |
| | Calculation |
| |   If(Sector Name="▮▮▮▮▮",SpareGlobalNum+1& |
| |   ▮▮▮▮▮",SpareGlobalNum+1) |
| Set Field | SenttoFilmDate |
| | Calculation |
| |   Today |
| Send Apple Event | Event Specification: |
| |   Application:Adobe®PageMaker®6.5 |
| |   Event Class:misc |
| |   Event ID:dosc |
| |   Field:BCard08 |
| |   Wait for reply |
| |   Bring application to foreground |
| Go to Record/Request/Page | |
|   Next | |
| Set Field | PlateRefNum |
| | Calculation |
| |   If(Sector Name="▮▮▮▮▮",SpareGlobalNum+1& |
| |   ▮▮▮▮▮",SpareGlobalNum+1) |
| Set Field | SenttoFilmDate |
| | Calculation |
| |   Today |
| Send Apple Event | Event Specification: |
| |   Application:Adobe®PageMaker®6.5 |
| |   Event Class:misc |
| |   Event ID:dosc |
| |   Field:BCard09 |
| |   Wait for reply |
| |   Bring application to foreground |
| Go to Record/Request/Page | |
|   Next | |

FIG. 13-4

| Script Step/Options | Script Parameters |
|---|---|
| Set Field | PlateRefNum<br>Calculation<br>    If(Sector Name="▇▇▇▇▇",SpareGlobalNum+1&<br>    ▇▇▇▇▇",SpareGlobalNum+1) |
| Set Field | SenttoFilmDate<br>Calculation<br>    Today |
| Send Apple Event | Event Specification:<br>    Application:Adobe®PageMaker ®6.5<br>    Event Class:misc<br>    Event ID:dosc<br>    Field:BCard10<br>    Wait for reply<br>    Bring application to foreground |
| Go to Record/Request/Page<br>  Next | |
| Set Field | PlateRefNum<br>Calculation<br>    If(Sector Name="▇▇▇▇▇",SpareGlobalNum+1&<br>    ▇▇▇▇▇",SpareGlobalNum+1) |
| Set Field | SenttoFilmDate<br>Calculation<br>    Today |
| Send Apple Event | Event Specification:<br>    Application:Adobe®PageMaker ®6.5<br>    Event Class:misc<br>    Event ID:dosc<br>    Field:BCard11<br>    Wait for reply<br>    Bring application to foreground |
| Go to Record/Request/Page<br>  Next | |
| Set Field | PlateRefNum<br>Calculation<br>    If(Sector Name="▇▇▇▇▇",SpareGlobalNum+1&<br>    ▇▇▇▇▇",SpareGlobalNum+1) |
| Set Field | SenttoFilmDate |

FIG. 13-5

| Script Step/Options | Script Parameters |
|---|---|
| Send Apple Event | Calculation<br>  Today<br>Event Specification:<br>  Application:Adobe®PageMaker ®6.5<br>  Event Class:misc<br>  Event ID:dosc<br>  Field:BCard12<br>  Wait for reply<br>  Bring application to foreground |
| Go to Record/Request/Page<br>  Next | |
| Set Field | PlateRefNum<br>Calculation<br>  If(Sector Name="▮▮▮▮▮",SpareGlobalNum+1&<br>  ▮▮▮▮▮",SpareGlobalNum+1) |
| Set Field | SenttoFilmDate<br>Calculation<br>  Today |
| Send Apple Event | Event Specification:<br>  Application:Adobe®PageMaker ®6.5<br>  Event Class:misc<br>  Event ID:dosc<br>  Field:BCard13<br>  Wait for reply<br>  Bring application to foreground |
| Go to Record/Request/Page<br>  Next | |
| Set Field | PlateRefNum<br>Calculation<br>  If(Sector Name="▮▮▮▮▮",SpareGlobalNum+1&<br>  ▮▮▮▮▮",SpareGlobalNum+1) |
| Set Field | SenttoFilmDate<br>Calculation<br>  Today |
| Send Apple Event | Event Specification:<br>  Application:Adobe®PageMaker ®6.5<br>  Event Class:misc |

FIG. 13-6

| Script Step/Options | Script Parameters |
|---|---|
| | Event ID:dosc<br>Field:BCard14<br>Wait for reply<br>Bring application to foreground |
| Go to Record/Request/Page<br>  Next | |
| Set Field | PlateRefNum<br>Calculation<br>  If(Sector Name="▇▇▇▇▇",SpareGlobalNum+1&<br>▇▇▇▇▇",SpareGlobalNum+1) |
| Set Field | SenttoFilmDate<br>Calculation<br>  Today |
| Send Apple Event | Event Specification:<br>  Application:Adobe®PageMaker ®6.5<br>  Event Class:misc<br>  Event ID:dosc<br>  Field:BCard15<br>  Wait for reply<br>  Bring application to foreground |
| Go to Record/Request/Page<br>  Next | |
| Set Field | PlateRefNum<br>Calculation<br>  If(Sector Name="▇▇▇▇▇",SpareGlobalNum+1&<br>▇▇▇▇▇",SpareGlobalNum+1) |
| Set Field | SenttoFilmDate<br>Calculation<br>  Today |
| Send Apple Event | Event Specification:<br>  Application:Adobe®PageMaker ®6.5<br>  Event Class:misc<br>  Event ID:dosc<br>  Field:BCard16<br>  Wait for reply<br>  Bring application to foreground |

FIG. 13-7

| Script Step/Options | Script Parameters |
|---|---|
| Go to Record/Request/Page<br>  Next | |
| Set Field | PlateRefNum<br>Calculation<br>  If(Sector Name="▮▮▮▮▮",SpareGlobalNum+1&<br>  ▮▮▮▮▮",SpareGlobalNum+1) |
| Set Field | SenttoFilmDate<br>Calculation<br>  Today |
| Send Apple Event | Event Specification:<br>  Application:Adobe®PageMaker®6.5<br>  Event Class:misc<br>  Event ID:dosc<br>  Field:BCard17<br>  Wait for reply<br>  Bring application to foreground |
| Go to Record/Request/Page<br>  Next | |
| Set Field | PlateRefNum<br>Calculation<br>  If(Sector Name="▮▮▮▮▮",SpareGlobalNum+1&<br>  ▮▮▮▮▮",SpareGlobalNum+1) |
| Set Field | SenttoFilmDate<br>Calculation<br>  Today |
| Send Apple Event | Event Specification:<br>  Application:Adobe®PageMaker®6.5<br>  Event Class:misc<br>  Event ID:dosc<br>  Field:BCard18<br>  Wait for reply<br>  Bring application to foreground |
| Go to Record/Request/Page<br>  Next | |
| Set Field | PlateRefNum<br>Calculation<br>  If(Sector Name="▮▮▮▮▮",SpareGlobalNum+1& |

FIG. 13-8

| Script Step/Options | Script Parameters |
|---|---|
| | If(Sector Name="▇▇▇▇",SpareGlobalNum+1&<br>▇▇▇▇",SpareGlobalNum+1) |
| Set Field | SenttoFilmDate<br>Calculation<br>  Today |
| Send Apple Event | Event Specification:<br>  Application:Adobe®PageMaker®6.5<br>  Event Class:misc<br>  Event ID:dosc<br>  Field:BCard19<br>  Wait for reply<br>  Bring application to foreground |
| Go to Record/Request/Page<br>  Next | |
| Set Field | PlateRefNum<br>Calculation<br>  If(Sector Name="▇▇▇▇",SpareGlobalNum+1&<br>  ▇▇▇▇",SpareGlobalNum+1) |
| Set Field | SenttoFilmDate<br>Calculation<br>  Today |
| Send Apple Event | Event Specification:<br>  Application:Adobe®PageMaker®6.5<br>  Event Class:misc<br>  Event ID:dosc<br>  Field:BCard20<br>  Wait for reply<br>  Bring application to foreground |
| Go to Record/Request/Page<br>  Next | |
| Set Field | PlateRefNum<br>Calculation<br>  If(Sector Name="▇▇▇▇",SpareGlobalNum+1&<br>  ▇▇▇▇",SpareGlobalNum+1) |
| Set Field | SenttoFilmDate<br>Calculation<br>  Today |

FIG. 13-9

| Script Step/Options | Script Parameters |
|---|---|
| Send Apple Event | Event Specification:<br>    Application:Adobe®PageMaker®6.5<br>    Event Class:misc<br>    Event ID:dosc<br>    Field:BCard21<br>    Wait for reply<br>    Bring application to foreground |
| Go to Record/Request/Page<br>  Next | |
| Set Field | PlateRefNum<br>Calculation<br>    If(Sector Name="■■■■■",SpareGlobalNum+1&<br>    ■■■■■",SpareGlobalNum+1) |
| Set Field | SenttoFilmDate<br>Calculation<br>    Today |
| Send Apple Event | Event Specification:<br>    Application:Adobe®PageMaker®6.5<br>    Event Class:misc<br>    Event ID:dosc<br>    Field:BCard22<br>    Wait for reply<br>    Bring application to foreground |
| Go to Record/Request/Page<br>  Next | |
| Set Field | PlateRefNum<br>Calculation<br>    If(Sector Name="■■■■■",SpareGlobalNum+1&<br>    ■■■■■",SpareGlobalNum+1) |
| Set Field | SenttoFilmDate<br>Calculation<br>    Today |
| Send Apple Event | Event Specification:<br>    Application:Adobe®PageMaker®6.5<br>    Event Class:misc<br>    Event ID:dosc<br>    Field:BCard23 |

FIG. 13-10

| Script Step/Options | Script Parameters |
|---|---|
| | Wait for reply |
| | Bring application to foreground |
| Go to Record/Request/Page<br>  Next | |
| Set Field | PlateRefNum<br>Calculation<br>  If(Sector Name="▮▮▮▮",SpareGlobalNum+1&<br>  ▮▮▮▮",SpareGlobalNum+1) |
| Set Field | SenttoFilmDate<br>Calculation<br>  Today |
| Send Apple Event | Event Specification:<br>  Application:Adobe®PageMaker ®6.5<br>  Event Class:misc<br>  Event ID:dosc<br>  Field:BCard24<br>  Wait for reply<br>  Bring application to foreground |
| Go to Record/Request/Page<br>  Next | |
| Set Field | PlateRefNum<br>Calculation<br>  If(Sector Name="▮▮▮▮",SpareGlobalNum+1&<br>  ▮▮▮▮",SpareGlobalNum+1) |
| Set Field | SenttoFilmDate<br>Calculation<br>  Today |
| Send Apple Event | Event Specification:<br>  Application:Adobe®PageMaker ®6.5<br>  Event Class:misc<br>  Event ID:dosc<br>  Field:BCard25<br>  Wait for reply<br>  Bring application to foreground |
| Go to Record/Request/Page<br>  First | |

FIG. 13-11

| Script Step/Options | Script Parameters |
| --- | --- |
| Omit Multiple <br> No dialog | 25 |
| Set Field | SpareGlobalNum <br> Calculation <br>    SpareGlobalNim+1 |

FIG. 13-12

```
"measureunits 3,3,10"&"¶" &
    "select 2p5, 1p9"&"¶" &
    "textedit"&"¶" &
    "selectall" &"¶" &
    If(Name ≠ Empty,"textenter " & Quote & NameTitle & Quote
    &"¶","textenter " & Quote & " " & Quote & "¶") &
    "textcursor -textblock" &"¶" &
    "textselect +eol" &"¶" &
    "font " & Quote & "BI Garamond BoldItalic" & Quote & "¶" &
    "select 12p10, 4p6"&"¶" &
    "textedit"&"¶" &
    "selectall"&"¶" &
    "textenter " & Quote & Trim(AddressBCardLthd) & Quote &"¶" &
    "select 2p9, 10p10"&"¶" &
    "textedit"&"¶" &
    "selectall"&"¶" &
    "textenter " & Quote & If(EDSTagLine = Empty, " ", EDSTagLine) &
    Quote &"¶"
    "pringoptionsps normalimage, off, off, fast, on, off, off,
    off, off" & "¶" &
    "print1(1,1)"&"¶"&
    "close",
    Empty)
```

FIG. 14

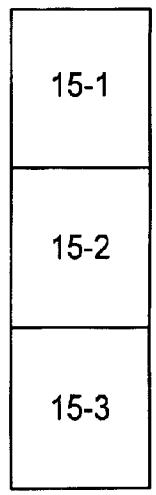

FIG. 15

```
If [" Status(CurrentFoundCount) = 6 "]
   Perform Script [Sub-scripts, " CountFor6 "]
Else
   If [" Status(CurrentFoundCount) = 7 "]
      Perform Script [Sub-scripts, " CountFor7 "]
   Else
      If [" Status(CurrentFoundCount) = 8 "]
         Perform Script [Sub-scripts, " CountFor8 "]
      Else
         If [" Status(CurrentFoundCount) = 15 "]
            Perform Script [Sub-scripts, " CountFor14 "]
         Else
            If [" Status(CurrentFoundCount) ≥ 16 "]
               Perform Script [Sub-scripts, " AutoTypeLithoCards "]
            End If
         End If
```

FIG. 15-1

Go to Record/Request/Page [First]
Duplicate Record/Request
Set Field [" JobTicket " , " "Dummy" " ]
Go to Record/Request/Page [No dialog , By Number...]
Duplicate Record/Request
Set Field [ " JobTicket " , " "Dummy" " ]
Go to Record/Request/Page [No dialog , By Number...]
Duplicate Record/Request
Set Field [ " JobTicket " , " "Dummy" " ]
Go to Record/Request/Page [No dialog , By Number...]
Duplicate Record/Request
Set Field [ " JobTicket " , " "Dummy" " ]
Go to Record/Request/Page [No dialog , By Number...]
Duplicate Record/Request
Set Field [ " JobTicket " , " "Dummy" " ]
Go to Record/Request/Page [No dialog , By Number...]

FIG. 15-2

```
New Record/Request
Set Field [ "JobTicket" , " "Dummy" " ]
Set Field [ "FirstName" , " "ZZDummy" " ]
Set Field [ "City" , " "ZZDummy" " ]
Set Field [ "Address1" , " "Dummy" " ]
Sort [Restore , No dialog]
Perform Script [Sub-scripts , "AutoTypeLithoCards" ]
```

FIG. 15-3

```
Set Error Capture [On]
Go to Layout ["Data Entry Form"]
Enter Find Mode []
Paste Literal [Select, "ExportedToJobTicket", "="]
Perform Find []
If ["Status(CurrentFoundCount) > 0"]
   Export Records []
   Go to Record/Request/Page [First]
   Paste Literal [Select, "ExportedToJobTicket", "x"]
   Replace [" ExportedToJobTicket"," Current contents "]
Else
   Beep
   Show Message ["There are no Business Cards to Export!!!"]
End If
Find All
Go to Layout [original layout]
```

FIG. 16

AUTOMATED TYPESETTING SYSTEM

CROSS-REFERENCE TO RELATED APPLICATIONS

This application claims the benefit of U.S. Provisional Application No. 60/105,977, filed Oct. 28, 1998.

STATEMENT REGARDING FEDERALLY SPONSORED RESEARCH OR DEVELOPMENT

Not Applicable.

REFERENCE TO A "MICROFICHE APPENDIX"

Not Applicable.

BACKGROUND OF THE INVENTION (1) Field of the Invention

The present invention relates generally to the art of layout and typesetting and, more particularly, to a computerized method and system of automated layout and typesetting for the production of engraved, embossed, and lithographed materials, such as stationery, envelopes, paper, and business cards.

(2) Description of the Prior Art

Since the early days of the commercial printing industry, and continuing through present day, the production of professionally printed goods-such as engraved, embossed, and lithographed stationery, envelopes, paper, business cards, and the like-has required extensive, time-consuming human design, layout, and typesetting expertise, proofing, and supervision. Today's commercial printing industry, however, requires even more time and attention to detail, as corporations invest millions of dollars developing highly-detailed corporate identities. Engraved, embossed, and lithographed stationery, envelopes, paper, business cards, and other goods are an integral part of a company's corporate identity campaign, and a major business expense. It is crucial that commercial printing technology advance in parallel to more effectively and efficiently handle the increasing industry demand.

Traditionally, a high level of human interaction in the production process has been required to ensure the final product satisfies high-detailed corporate identity specifications. Corporate identity specifications include customer-specific details including, among other things, font type, font size, precise font colors, logo size, logo placement, precise logo color, precise positioning measurements, character kerning and leading, and the like. Companies often publish extensive corporate identification manuals providing detailed guidelines governing the proper appearance of a company's corporate identity. Therefore, many time-consuming steps are required to produce an acceptable and accurate final product. It has therefore become necessary to dedicate considerable time and expense for obtaining experts in the art of layout, typesetting, proofing, and production. With such an increase in detail and required supervision, overhead, and ultimately consumer cost, have necessarily risen.

Under traditional prior art production systems, orders for printed products were typically placed via fax machine, in often-difficult-to-read hand-written format. An order would typically include the customer's name and internal identification number, identification of the goods being ordered (i.e., business cards), the quantity being ordered, the information to appear on the ordered goods (i.e., name, title, address, phone and fax numbers), and billing and shipping information. The orders would be gathered together at regular intervals throughout the day and manually key-stroked into an order processing system to produce an order summary ticket. The orders would then be directed to typesetting experts for typesetting scheduling.

Typically, orders would be scheduled for typesetting within a day or two after receipt, depending on backlog. The typesetting expert would review the order, keystroke the information from the order into the proper customer template (a template contains a customer's specific product layout information based on the customer's corporate identity specifications), manually adjust fonts, sizing, kerning, colors, and the like where necessary, and print out the draft typeset order for a proofreader's review. The proofreader would then isolate any typographical errors or formatting changes required by the customer's corporate identity specifications, and send those changes back to the typesetter for corrections. The typesetter would then manually correct the order. Once the corrections were made, the order would again be printed and reviewed a second time by the proofreader. If the proofreader determined that all of the customer's corporate identity specifications had been met and no typographical errors existed, the order was transmitted to the customer for approval.

Often times, after customer review, changes would need to be made due to poor fax quality, or because the typesetter or proofchecker overlooked an error. This time-consuming typesetting and proofing cycle was repeated until the order was approved by the customer and no further changes were required. Once the final approval was received, the order would be sent on to the printing department for preparation of the production plate or film. At its fastest, the entire process would typically take a minimum of three business days, and if further information was changed by the customer during the approval process, it would take even longer. Therefore, preparation of a single engraved business card order under using traditional prior art methods, for example, from receipt of order to creation of engraving production plate, may have taken anywhere from 3 to 5 days, or longer, with multiple and repeated levels of detailed, human proofing, and therefore, high overhead and increased consumer cost.

In addition to increased overhead and consumer cost, the extensive and repeated human supervision required under traditional prior art systems introduced multiple opportunities for error. Therefore, the inherent faults of prior art systems for receiving, processing, typesetting, and printing commercial engraved, embossed, and lithographed materials create a substantial demand for an automated typesetting system to increase efficiency, accuracy, and productivity, while decreasing production time, errors, and costs.

BRIEF SUMMARY OF THE INVENTION

The present invention solves the problems plaguing the prior art commercial engraved, embossed, and lithographed printing systems by providing a system that automatically typesets information into a production-ready format without the need for manual typesetting and proofing. The present invention is a novel integration of computerized hardware and software that permits an order for engraved, embossed, and lithographed materials to be received and processed electronically. The invention allows a template to be created containing the detailed criteria of a customer's corporate identity specifications, a database of customer-specific information to be created based on a customer's desired product and corporate identity specifications, order information to be automatically imported into the database, the fields of the template to be auto-populated by the order information in the database, the auto-populated data to be autotypeset according to the customer's corporate identity specifications, and the autotypeset template to be sent directly to the printing machinery for creation of the production plates. One embodiment of the invention includes an integrated electronic proofchecking option to allow orders to be proofchecked prior to printing the production plate or film. In another embodiment of the invention, the automated typesetting system is interactively coupled with a computerized order tracking, billing, shipping, and inventory control system.

Therefore, it is a general object of the present invention to provide a novel and useful computerized automated typesetting system for use in the commercial engraved, embossed, and lithographed printing industry.

Other more specific objects of the present invention are to decrease commercial printing order turnaround time, improve order processing efficiency, increase productivity, increase product quality, eliminate order errors, minimize repetitive order proofing, decrease overhead and administrative costs, and create substantial cost savings for customers.

A further object of the present invention is to provide a system in which no human adjustments or corrections to the information submitted by the customer are necessary before the information passes through the production process.

Another object of the present invention is to provide a system whereby order processing time, from receipt of order through typesetting, may be achieved within 1 day instead of 3 to 5 days.

It is also an object of the present invention to provide simple integration with an automated order tracking, billing, shipping, and inventory control system.

An additional object of the invention is to provide users of the system the ability to place orders for engraved, embossed, and lithographed materials, such as stationery, envelopes, paper, business cards, and the like, directly and electronically via a computer network, such through a Web site on the Internet, on a computer platform-independent basis, rather than relying on prior art error-prone ordering systems.

BRIEF DESCRIPTION OF THE DRAWINGS

FIG. 7 is an abridged sample FileMaker Pro Database File Program under the preferred embodiment of the present invention (redacted to remove confidential information unrelated to the disclosure of the present invention).

FIG. 9 is a sample Web Import Script listing the AppleScript code that allows data inputted via a Web site to be imported into a database file in the preferred embodiment of the present invention.

FIG. 12 is a sample Database File Search Script listing the FileMaker Pro script code that searches a database file to locate unprinted records in the preferred embodiment of the present invention.

FIG. 14 is a code listing from a sample FileMaker Pro database file instructing PageMaker, under the preferred embodiment of this invention, to print a template.

FIG. 15 is a sample series of Template Format Scripts listing the FileMaker Pro script code that instructs FileMaker Pro to create duplicate or dummy records where appropriate to fully populate a template in the preferred embodiment of the present invention.

FIG. 16 is a sample the Order Tracking, Billing, Shipping, and Inventory Control System Export Script listing the FileMaker Pro script code that instructs FileMaker Pro export data from a customer's database file to an external, interactively coupled order tracking, billing, shipping, and inventory control system in the preferred embodiment of the present invention.

DETAILED DESCRIPTION OF THE PREFERRED EMBODIMENT

A portion of the disclosure of this patent document contains material which is subject to copyright protection. The copyright owner has no objection to facsimile reproduction by anyone of the patent document or the patent disclosure, as it appears in the Patent and Trademark Office patent files or records, but otherwise reserves all copyright rights whatsoever.

Figure 1:
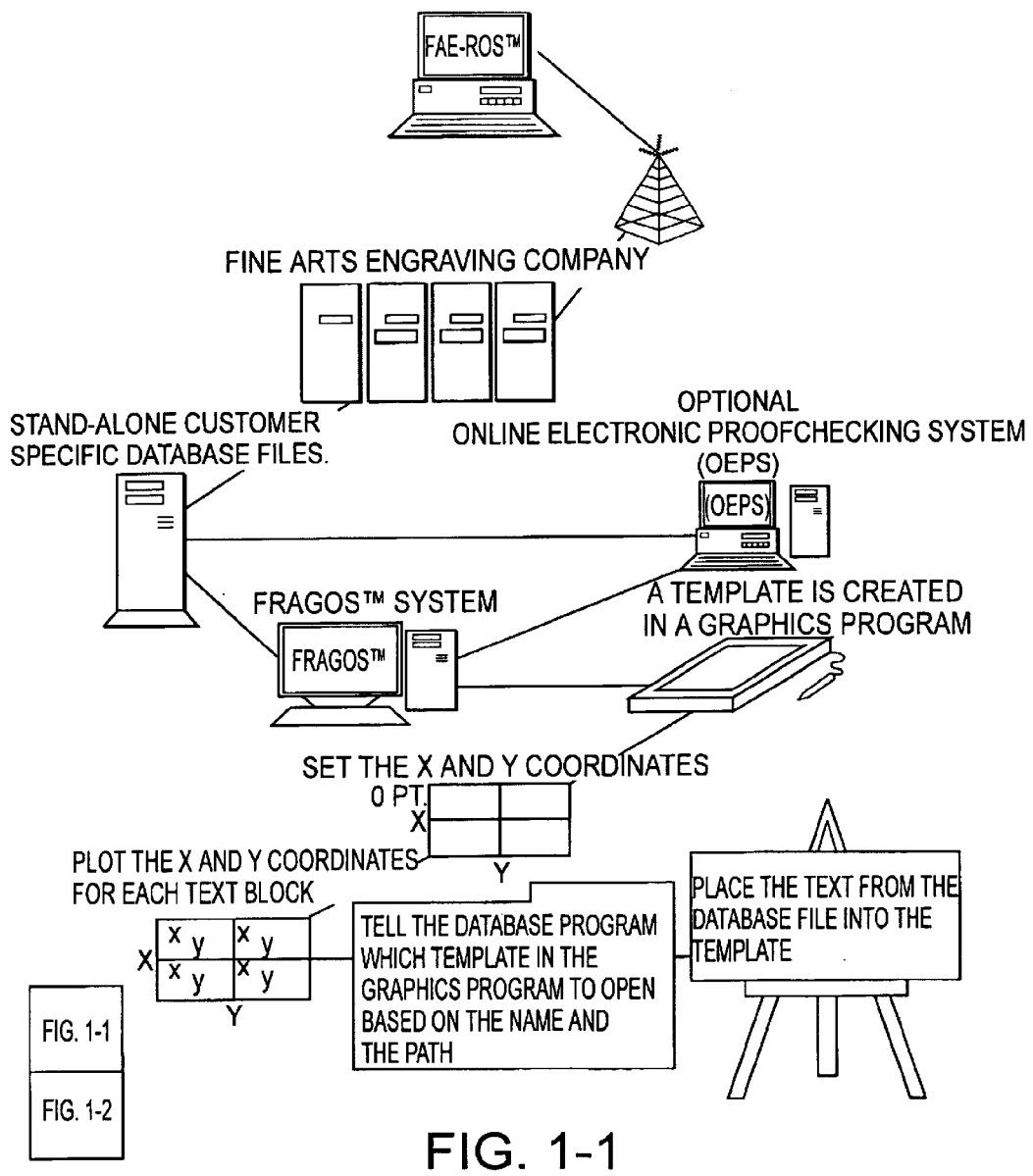
FIG. 1 is a diagram outlining the automated typesetting system taught by the preferred embodiment of the present invention.

An outline of the preferred embodiment of the present invention is shown in FIG. 1. The preferred embodiment of the present invention operates on Apple Computer, Inc.'s Macintosh computer operating system, using Apple Computer's standard operating software (System 7 or newer) and a combination the off-the-shelf software packages FileMaker Pro by Apple Computer's Claris division and Adobe PageMaker by Adobe Systems Inc. FileMaker Pro and PageMaker may reside on the same physical computer, or may reside of different computers, connected together using traditional, prior art networking technology.

FileMaker Pro is a scriptable database software program capable of receiving, storing, and manipulating data and allowing a user to create, design, and program customized databases; PageMaker is a graphics software program capable of receiving, storing, and manipulating text and graphics to create documents for publication and printing; and, Apple Computer's operating software is a scriptable computer software operating system capable of controlling events-compatible applications such as FileMaker Pro and PageMaker, allowing FileMaker Pro and Adobe PageMaker to communicate and exchange information with each other, and allowing multiple computers and peripherals to communicate and exchange information with each other either directly or over a network. FileMaker Pro and PageMaker are compatible with the Apple Computer operating system's AppleScript and Apple events scripting and events technology. Apple events-compatible programs can communicate with and control one another, allowing for the transfer and exchange of data and instructions. Those skilled in the art of graphic design are intimately familiar with the graphics software and hardware systems used in this invention, as a majority of such work is performed on Apple Macintosh computers using these programs. Those skilled in the art of events and script programming are intimately familiar with the programming techniques used in this invention.

The automated typesetting system of the present invention begins with the creation of an electronic template. The template is a set of coordinates and guides, for a certain document size and layout, used for production purposes. The template is created in a graphics software program that allows for creating, designing, storing, accessing, and updating a template and that is compatible with events and script technology, such as PageMaker in the preferred embodiment. The template is based on the design specifications of the customer's corporate identity and how the production process of the particular product is going to be run. The type of product design (stationery, envelopes, paper, business cards, etc.) and the customer's desired production run (engraved, embossed, lithographed, etc.) will dictate how the parameters of the template will be set up. Different production runs call for different layouts based on the type of product, the dimensions of that specific product, and how that particular product will be run for best production and cost efficiencies.

It will be appreciated that dozens of combinations of product designs and production runs are possible under the present invention, but by way of example only, this disclosure will often refer to the production of lithographed business cards. The present invention may be appropriately configured and programmed to allow for processing of myriad product designs and production runs as needed (i.e., embossed letterhead, engraved envelopes, lithographed stationery, etc.).

Figures 1, 2:
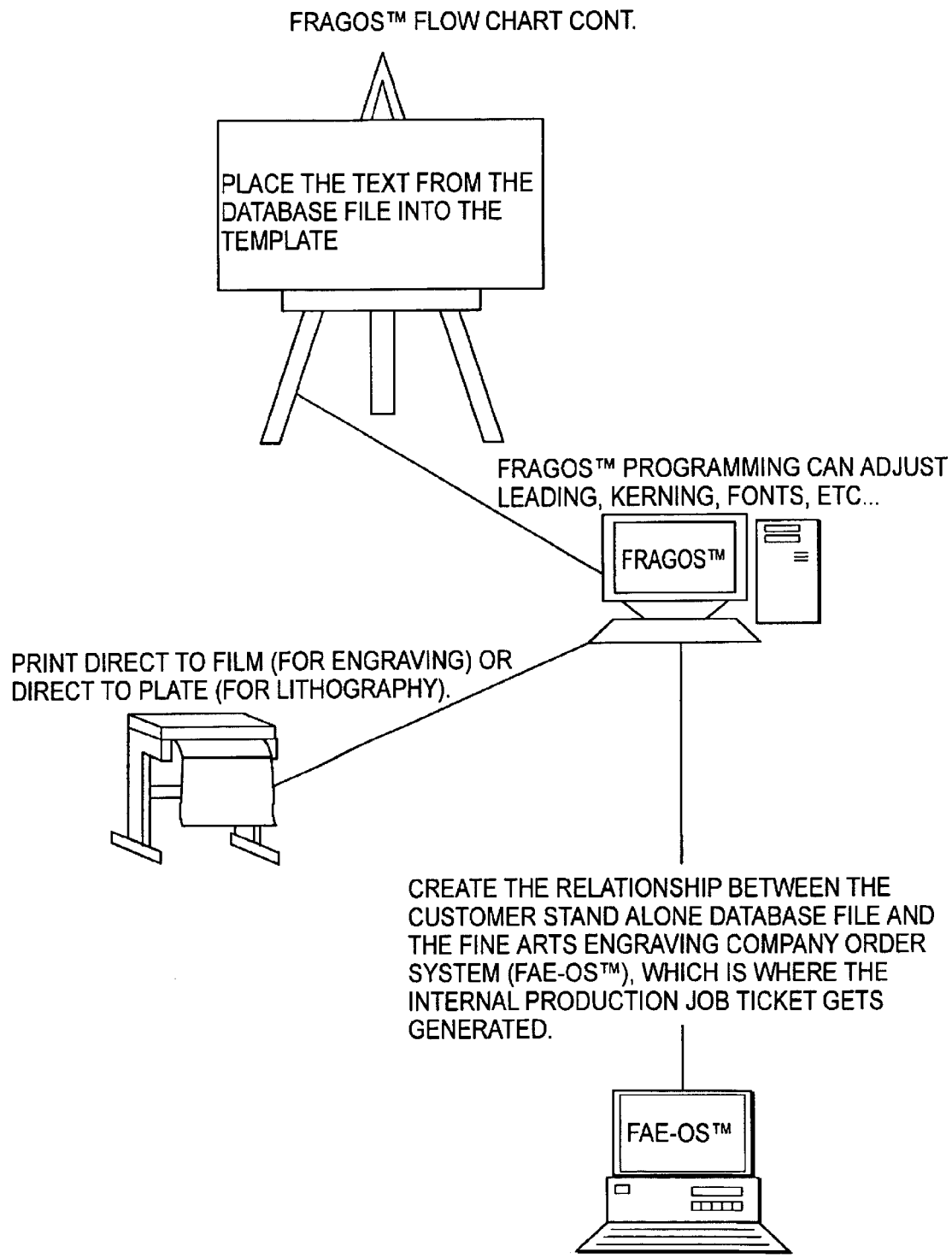
FIG. 2 is a sample PageMaker template for business cards created using the preferred embodiment of the present invention.

In the preferred embodiment of the present invention, the template is created using the PageMaker software program. A template is created for every individual customer and order on an as-needed basis, wherein each template contains the specific design and layout characteristics for that specific customer and that specific product design and production run. Using standard prior art design principles, the template is designed and configured in such a way so as to make production of the order possible while minimizing any potential loss of production time and production material waste. By way of example, a template for business cards may be created in a 3-up format, as shown in FIG. 2, since the size of a standard business cards permits at least 2 columns of 3 business cards to fit on a printing plate.

Figure 3:
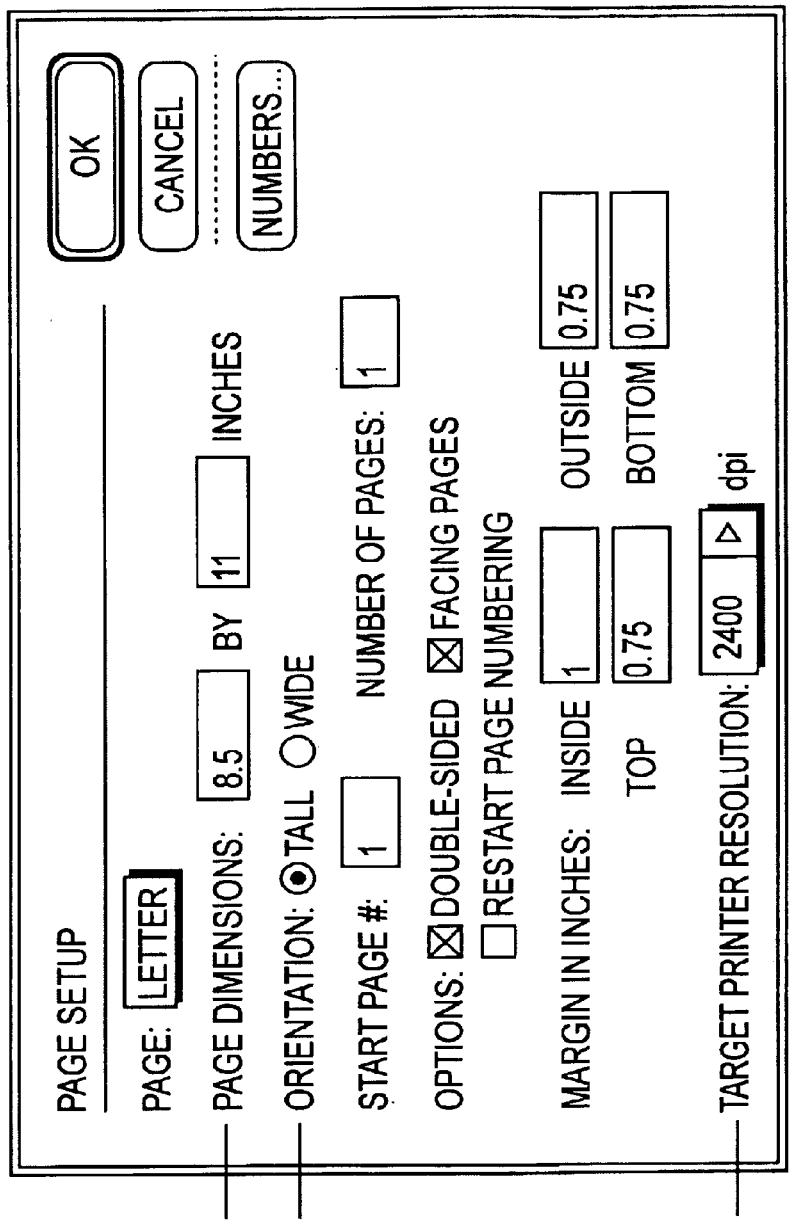
FIG. 3 is a sample PageMaker page setup dialog used to set a template's printing parameters using the preferred embodiment of the present invention.

To create a template with the proper configuration and layout for a specific order, the document size (the size of the production plate, for example), printing parameters, place locations (x-and-y coordinates) for text and object blocks, and any other related parameters are set in the PageMaker template using the PageMaker menus and resulting dialogs, FIG. 3, to set the document size (the size of the production plate), the document's printing parameters (i.e., portrait or landscape layout, printing resolution, etc.), and the template's text and object block locations.

Figure 4:
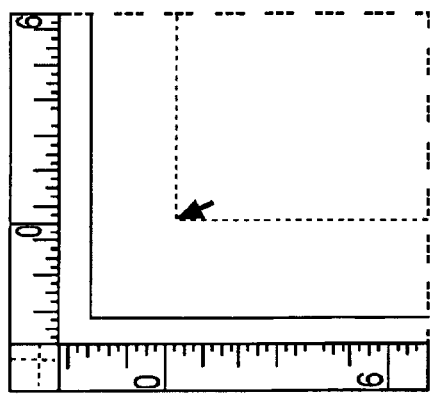
FIG. 4 is an illustration showing the setting of the zero-point of a template in PageMaker using the preferred embodiment of the present invention.
Figure 4:
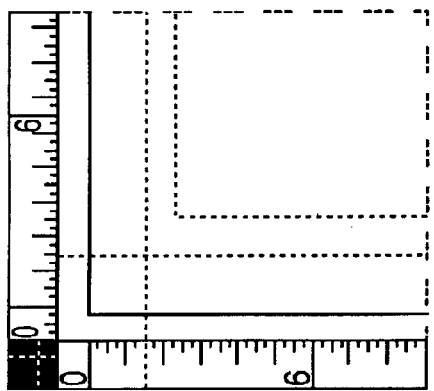
Figure 4:
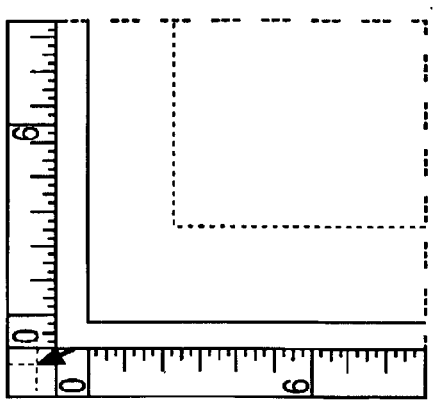

The text and object block locations are entered into the PageMaker template by first establishing the x-and-y coordinates of the template based on a fixed zero-point location (0,0), which resides in the upper left-hand corner of the template. To set the zero-point in the preferred embodiment of this invention, the pointer tool is positioned on the cross section in the zero-point window, FIG. 4, and the zero-point is dragged to the proper location. Releasing the mouse button to resets the zero-point to the new location.

Once the fixed zero-point location for the template is set, creation of the template continues by plotting the various x-and-y coordinates for the location of each text and/or object block required by the product design, production run, and the customer's corporate identity specifications. Each location on the template has its own unique x-and-y coordinates. Based on the specific design, there may be as few as one text block for all of the required information, or various combinations of text and/or object blocks, each block designed to hold different information (such as name, title, address, phone number, company logo, etc.).

Figure 5:
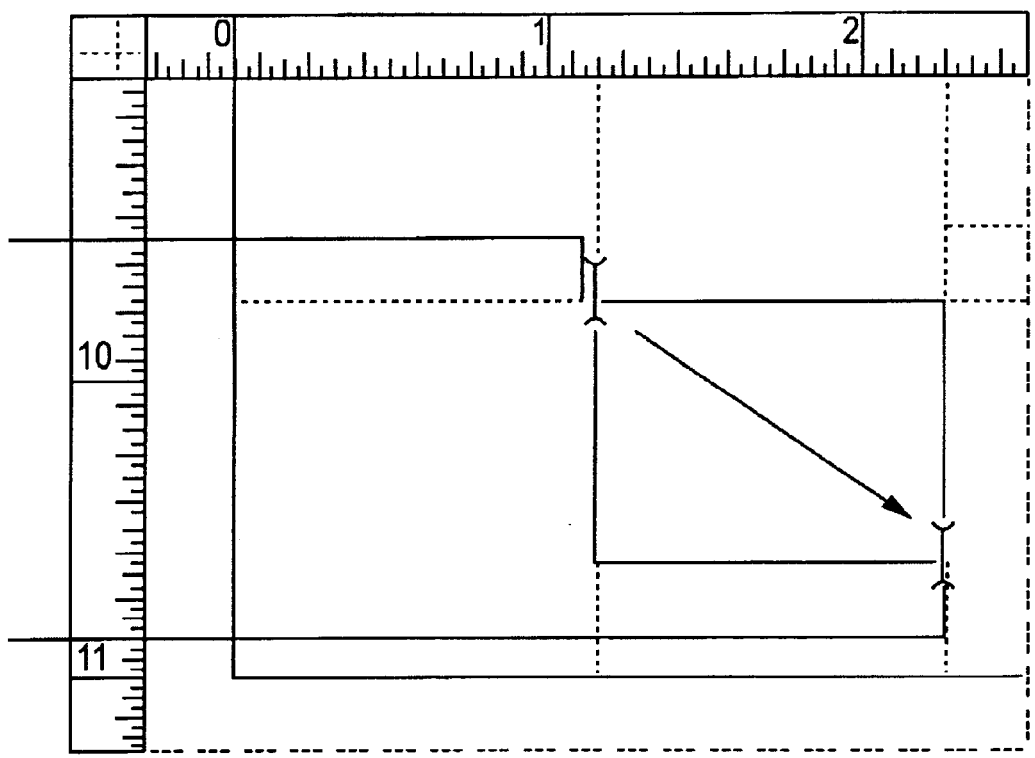
FIG. 5 is an illustration showing the creation of a text block in a template in PageMaker using the preferred embodiment of the present invention.

Setting the x-and-y coordinates for the text and object blocks is done manually, using the PageMaker standard design tools to establish the size and location of each block, FIG. 5. As shown in FIG. 2, dummy text may be placed in the blocks as place holders to help determine the size and positioning of each block. For example, for a 5-up lithographed business card template, the template would contain the layout specifications of 25 individual business cards or, as shown in FIG. 2, a template could contain the layout specifications for 6 individual business cards in a 3-up format. The template layout, as mentioned above, is determined using prior art graphic design techniques to minimize production waste. The time required to establish all of the x-and-y coordinates for each block will vary depending on the desired product design, production run, and corporate identity specifications, however, the coordinates need only be established once per template. Once a template for a specific product design, production run, and corporate identity specification is created, it may be saved and reused indefinitely until that customer's corporate identity specifications are changed or updated.

Figure 6:
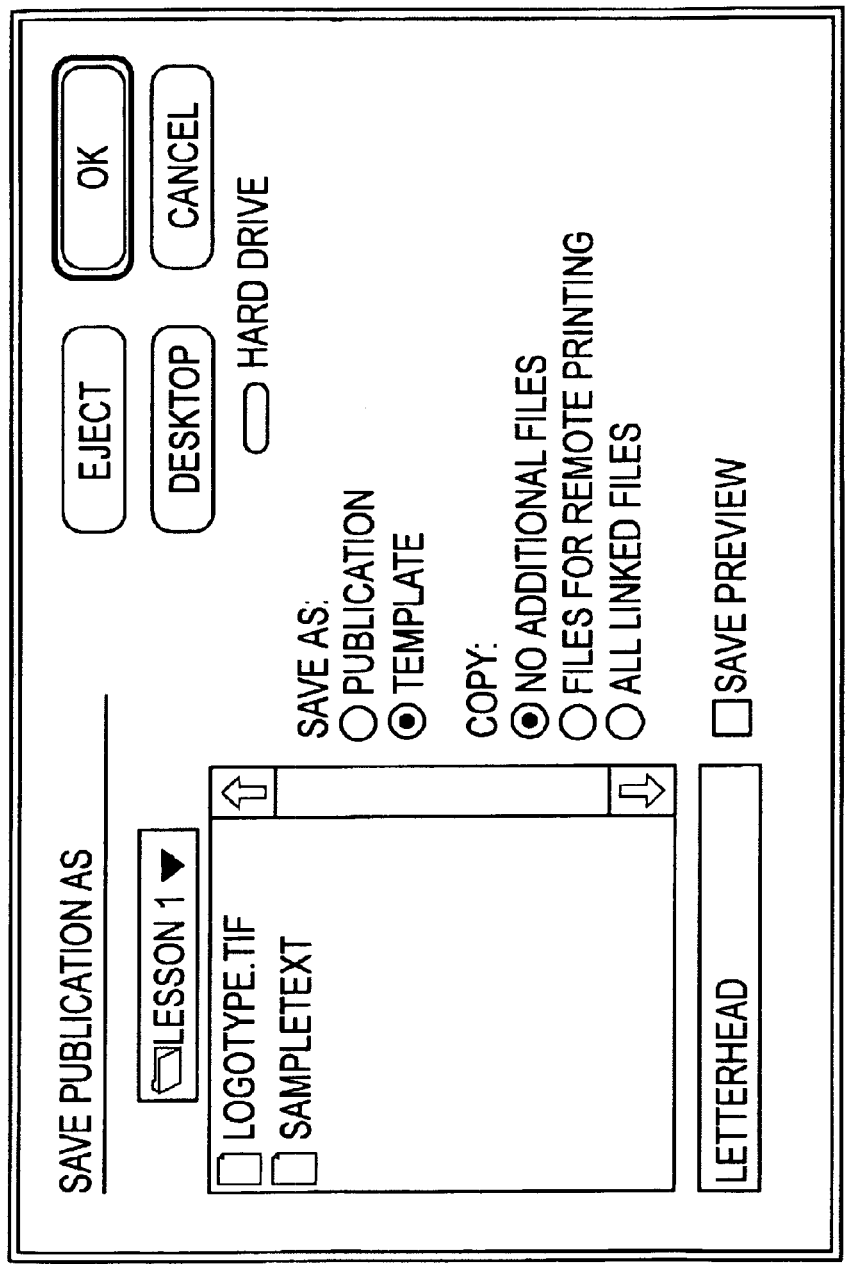
FIG. 6 is a sample PageMaker save menu used to save a completed template using the preferred embodiment of the present invention.

Once the x-and-y coordinates for all text and object blocks on the template have been established, the template is given a name and path (the specific location of a file on a computer's storage media) and saved so as to permanently maintain the zero point location, the various x-and-y coordinates, and the other document and print parameters that have been established. Saving the template may be accomplished using Adobe PageMaker's standard save menu, FIG. 6.

In addition to the creation of an appropriate template, a database file is created and programmed to receive and store the populating data (such as name, title, address, phone number, etc.) that will ultimately populate a template and to store the instructions that will be used to format the populating data that will appear in a template's blocks (font, size, kerning, color, etc.). In the preferred embodiment of the present invention, the database software program FileMaker Pro is used to create, design, program, store, access, and update the database file and store, access, and update the file's records. FileMaker Pro's internal scripting language, in combination with Apple Computer, Inc.'s system software's AppleScript and Apple events technology, allows FileMaker Pro to communicate and interact with PageMaker.

FileMaker Pro allows the creation and customization of a database file to receive, store, and manipulate data. A database file is created on a customer-by-customer basis. Therefore, each database file contains the database fields needed to process any order for any product needed by that specific customer. By way of example, the database file for a customer who only orders lithographed business cards will contain, at a minimum, the fields necessary to receive the data that will ultimately populate the lithographed business card template created for that customer. The database file may also contain supplemental fields to hold other information about an order. Database files for other customers may include alternate or additional fields depending on the product designs and production runs desired by that specific customer. Like templates, database files may be changed and updated as necessary to reflect a customer's changing corporate identity and/or desired product designs or production runs.

Creating and programming a database file to include the necessary fields uses standard prior art FileMaker Pro database programming techniques intimately familiar to those skilled in the art of database programming. For example, the database file for a customer who orders business cards is programmed using the preferred embodiment of the present invention to contain, at a minimum, the following indexed text fields to represent the information that typically appears on a business card: Address1, Address2, Address3, and Address4 (representing the up to four lines of an address); City (representing the city); Company Name (representing the company name); Country (representing the country); Email (representing the email address); Fax (representing the fax number); Name (representing the name), State (representing the state), Title (representing the title), and Zip Code (representing the Zip code), as shown in the abridged sample Database File Program, FIG. 7. The abridged sample Database File Program, FIG. 7, also shows examples of other fields, describe below in further detail, that may be used in the preferred embodiment of the present invention to allow the present invention to be interactively coupled with an order tracking, shipping, billing, and inventory control system. An unabridged sample Database File Program under the preferred embodiment of the present invention is appended (redacted to remove confidential information unrelated to the disclosure of the present invention).

As further shown in FIG. 7 and in the appended unabridged sample Database File Program, the database file is programmed to include a number of calculation fields. Calculation fields, as known to those skilled in the art of FileMaker Pro database programming, perform calculations or otherwise manipulate data based on the instructions contained within the calculation field. Of significant importance in the preferred embodiment of the present invention are the database file calculation fields containing the instructions and parameters to be transmitted to and performed by PageMaker in the population of a template and the formatting of the populating data on the template. In FIG. 7 and in the appended unabridged sample Database File Program, an example of one such a field is BCard01. The BCard01 calculation field is programmed to contain the PageMaker instructions and parameters needed to populate and format the first business card on a template. Likewise, BCard02 contains the PageMaker instructions and parameters needed to populate and format the second business card on a particular template. BCard03 contains the instructions and parameters for the third card, and so on. Enough calculation fields are programmed into the database file to provide for the population and formatting for an entire template. A more detailed explanation of such instructions and parameters is presented later is this description.

In operation, populating data is entered into a customer's database file through various front end mechanisms, including manual entry of the data into the database file, but preferably by automated electronic means such as through an Internet Web site, remote access, File Transfer Protocol (FTP), or e-mail. In the preferred embodiment of the present invention, an Internet Web site is used to receive the populating data. Web site entry is preferred because it allows for worldwide, computer-platform independent access to the automated typesetting system taught by the present invention.

Figure 8:
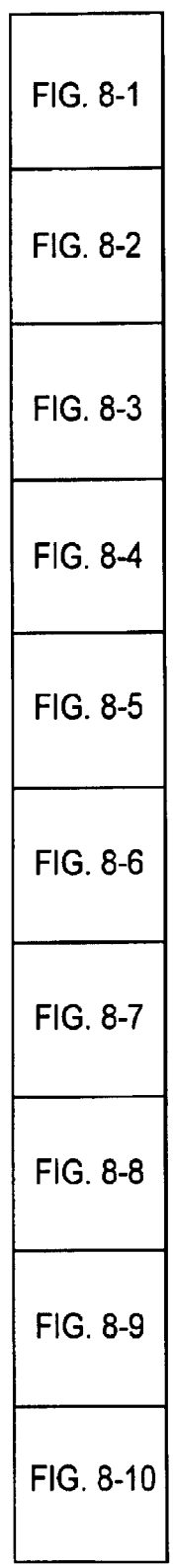
FIG. 8 is a sample Web Site Program listing HyperText Markup Language code that allows a user of the preferred embodiment of the present invention to enter populating data via an Internet Web site (redacted to remove confidential information unrelated to the disclosure of the present invention).
Figure 10:
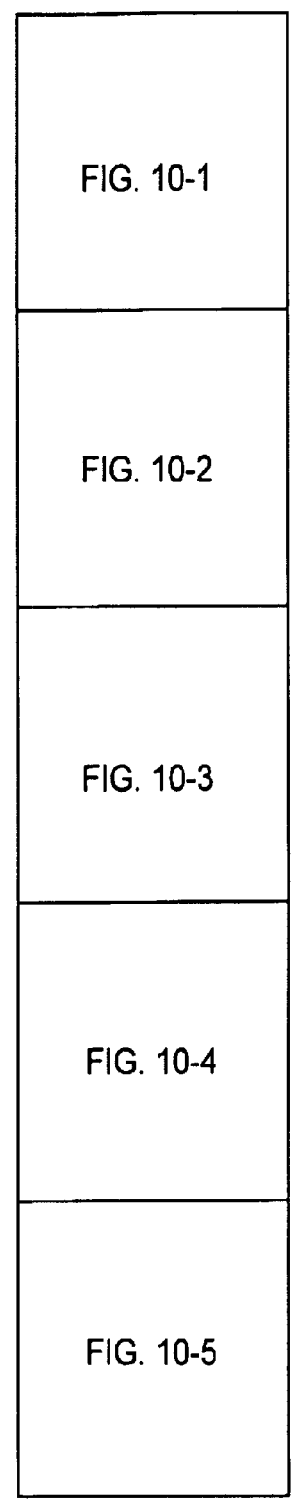
FIG. 10 is a sample FileMaker Pro Web Import Script listing the FileMaker Pro script code that allows data inputted via a Web site to be imported into a database file in the preferred embodiment of the present invention (redacted to remove confidential information unrelated to the disclosure of the present invention).

Using standard prior art HyperText Markup Language (HTML) programming language, specific Web pages are created for each customer and are programmed to allow the user of the Web site to place orders for products created by the present invention by permitting electronic entry of the populating data and other order parameters. The HTML programming code, as shown in the sample Web Site Program in FIG. 8, allows the data received from a Web site user. The Web site may be hosted on the same physical computer as FileMaker Pro and/or PageMaker or, in the preferred embodiment of the present invention, may be connected to the FileMaker Pro-hosting computer using standard, prior art computer networking technology. The data is automatically imported, field by field, into the customer's database file using a combination of AppleScript and FileMaker Pro script programming, as shown in their preferred embodiments in FIG. 9, the sample AppleScript Web Import Script, and FIG. 10, the sample FileMaker Pro Web Import Script.

Figure 11:
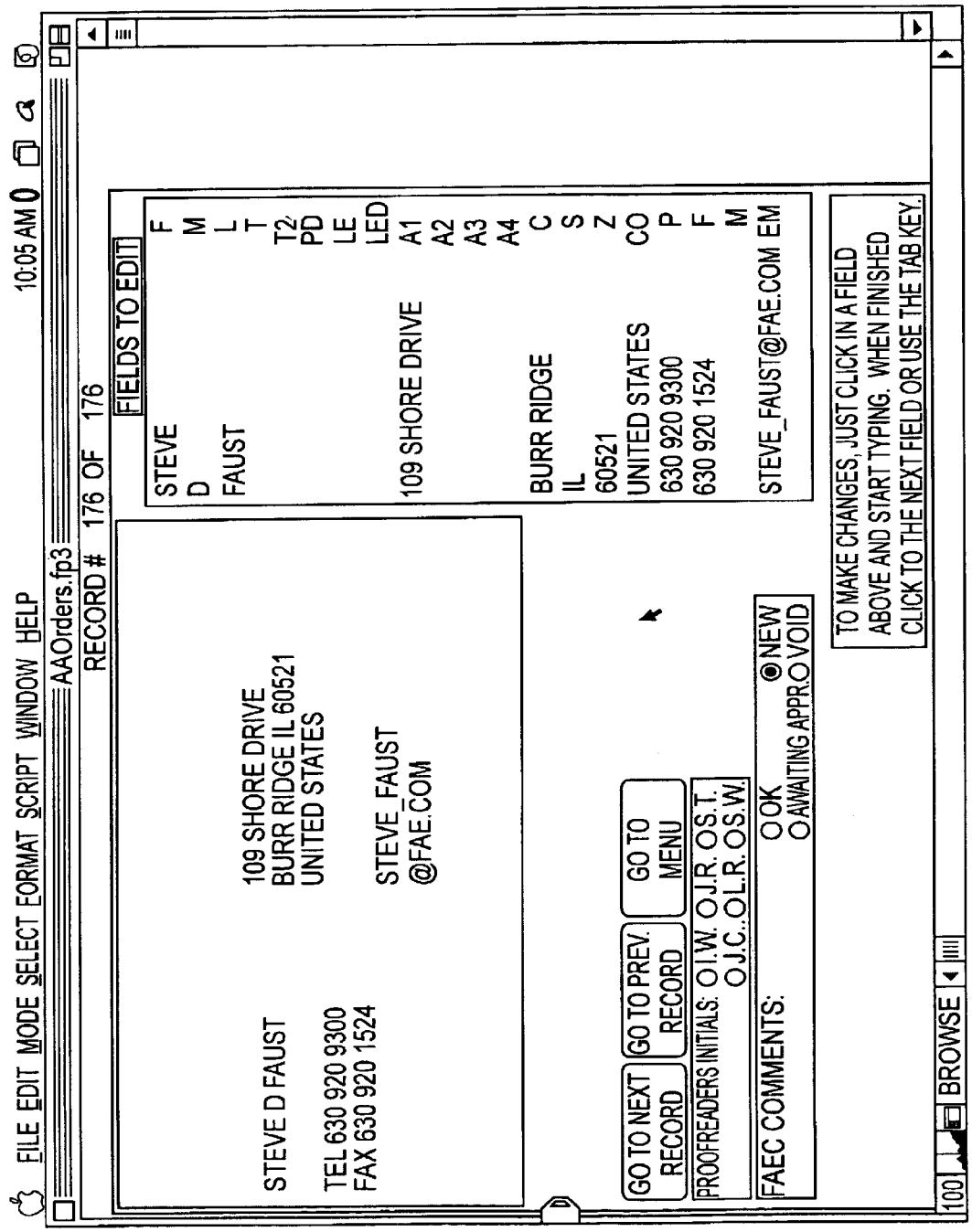
FIG. 11 is a computer screen shot showing a sample electronic proofchecking screen for proofchecking and correcting the populating data in a database file record in the preferred embodiment of the present invention.

After the populating data is entered into the database file, in one embodiment of the present invention, the populating data may be optionally electronically proofchecked for design specification verification. FileMaker Pro may be programmed, to display the populating data in the appropriate product design format, FIG. 11. If it is then found that some type of error has been inputted that would compromise the customer's design, or a typographical error has occurred, the record can be immediately fixed by correcting the populating data in the appropriate database file record's field, as shown in FIG. 11. To preserve the integrity of the original data that was inputted into the customer database file by the customer, the original information may be maintained in one set of database file fields and the modified information in separate set of fields. Alternatively, the populating data, in the form of database records, may be checked by a human proofreader to confirm grammatical and contextual correctness. Records that then receive proofreader approval may continue on through the production process.

The remainder of the present invention involves execution of appropriate scripts to allow PageMaker and FileMaker Pro to exchange the information required to produce a final product ready for production. In the preferred embodiment of the present invention, a FileMaker Pro script is created, using FileMaker Pro's internal scripting language, and as shown in FIG. 12, the sample Database File Search Script, to instruct FileMaker Pro to locate customer database file records that have not yet been populated into a template, and therefore, not yet printed. This is accomplished using fields created in each customer's database file that will flag when a record is sent to a template. As shown in FIG. 7 and in the appended unabridged sample Database File Program, the SenttoFilm indexed text field is programmed into the database file and initially set to a value of "No."

As shown in FIG. 12, the FileMaker Pro database program is instructed to search a customer database file and locate, for like records (such as by division, address, city, etc.), those records that have not yet been printed by looking for unflagged records, or records where the SenttoFilm field contains the "No" value. After FileMaker Pro finds such unprinted records in a customer database file, the found set of records is sent to PageMaker for population of the appropriate template by the Template Populating Script, FIG. 13.

Figure 13:
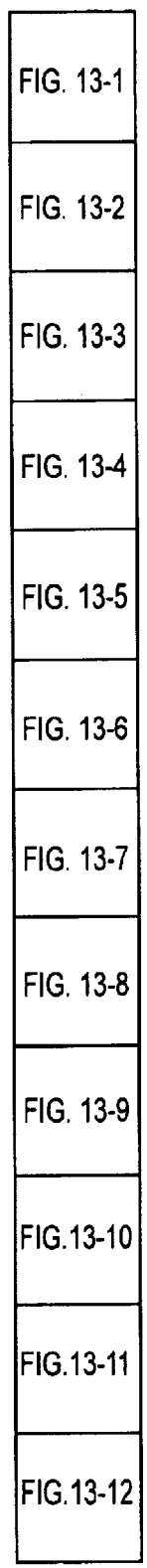
FIG. 13 is a sample Template Populating Script listing the FileMaker Pro script code that sends a found set of unprinted database file records to PageMaker for printing in the preferred embodiment of the present invention (redacted to remove confidential information unrelated to the disclosure of the present invention).

Beginning with the first record in a found set of unprinted records, the Template Populating Script, FIG. 13, using events technology, sends the populating data from the first found record to PageMaker. When programming the communication of commands between FileMaker Pro and PageMaker, it is crucial to encapsulate the commands within quotation marks followed by a calculation field (the Quote field, as shown in FIG. 7 and in the appended unabridged sample Database File Program) that contains a calculation to produce quotation marks. The exact syntax of the FileMaker Pro to PageMaker commands is essential for, if the syntax is incorrect, the script will cease operation at the first indication of missing or additional quotation marks.

As shown in FIG. 7, in the appended unabridged sample Database File Program, and in FIG. 13, the populating data is sent from FileMaker Pro to PageMaker through the BCard01 calculation field, mentioned above. The programming in the BCard01 calculation field first instructs Page-Maker to open (using the "open" command) the correct template created for the specific product design and production run. The template is identified by the name and path assigned to it when it was created, as discussed above. The path can reside on a local hard drive or can be located on a networked drive.

The Database File Program calculation field is programmed to set the measurement units of the PageMaker template (using the "measureunits" command). The Database File Program calculation field is further programmed to select the x-and-y coordinate locations of the template's first block, enter a text edit mode, select all of the information that currently resides in that block of the template (the dummy text entered in the template) as place holders, and then place the populating data from identified database file field into the block that is currently selected in the template. This is accomplished using the "select," "textedit," "selectall," and "textenter" commands as shown in the BCard01 calculation filed in FIG. 7 and in the appended unabridged sample Database File Program.

After the populating data is entered into the first block of the template, the various design specifications for that block, such as kerning, leading, font styles, font sizes, colors, etc., are adjusted. This is accomplished by programming the design specification commands into the Database File Program's calculation field. Using the appropriate PageMaker commands, such as "select," "textedit," "textselect," "font," "sizebump," "KernText," and "Color," as shown in the BCard01 calculation field in FIG. 7 and in the appended unabridged sample Database File Program, FileMaker Pro instructs PageMaker to select the appropriate x-and-y coordinates of the block that needs to be adjusted, resets Page-Maker into a text edit mode, and transmits to PageMaker the commands necessary to complete the desired formatting. For example, to set the kerning for a given text block, PageMaker is instructed by FileMaker Pro to set the cursor within the appropriate text block (identified by its x-and-y coordinates), highlight the text that needs to be kerned, and adjust the kerning as required. The design parameters are based on a customer's corporate identity specifications as programmed into the Database File Program.

The present invention can set any formatting that a human operator could set manually. The great advantage is that a human operator could accidentally move or change something incorrectly, where the present invention cannot—it only moves or adjusts the data it is programmed to change.

When the first set of x-and-y coordinates have been fully populated and formatted, Database File Program's calculation field is programmed to continue on to the x-and-y coordinates of the next block on the template and perform the identical functions as stated above for the populating of the block and the formatting of the populating data according to the programmed design specifications. Once all of the populating data from the first found record is populated and formatted, the Template Populating Script instructs File-Maker Pro to move on to the next found record and to repeat the process for the next set of blocks on the template (for example BCard02), as shown in FIG. 7 and in the appended unabridged sample Template Populating Script. Only after all of the populating data from all of the found records have been fully populated with all formatting design specifications followed, is PageMaker instructed by FileMaker Pro (using the "printoptionsps" and "print" commands, as shown in FIG. 14) to send the template direct to the appropriate device, either directly connected or connected over a computer network using standard, prior art networking technology, for the manufacture of production-ready plates or films.

In the event that the number of found records in a customer's database file does not match the available space on the appropriate template, the system will compensate to ensure the most efficient production run. For example, if multiple found records exist, and the total count exceeds the number of set x-and-y coordinates on the appropriate template, FileMaker Pro instructs PageMaker to populate the first template as stated above and then instructs Page-Maker to open subsequent templates until all records in the found set are populated on templates, as shown in FIG. 15, the Template Format Scripts.

Similarly, if the number found records is of an odd number, in which the whole template cannot be populated, the Template Format Scripts instruct FileMaker Pro to duplicate records or make a dummy records as appropriate to finish the process. An example of the preferred embodiment of this process is shown in FIG. 15. Examples of the process are explained below.

If the production will be engraving printed on a three-up plate, the programming ensures that FileMaker Pro properly populates the appropriate template as follows. When the number of found records to be printed is equal to one, four, seven or ten, FileMaker Pro is programmed to duplicate the last record two times to make a complete three-up plate of that record. If the number of sets is equal to two, five, eight or eleven, FileMaker Pro is programmed to create a dummy blank record to complete the three-up plate.

The same philosophy applies to lithography orders. For instance, if a lithographic plate accommodates thirty business cards running five-up, FileMaker Pro is programmed to perform counts based on multiples of five to properly populate the appropriate template with minimum waste. If the number of sets is one, it would populate the whole plate by itself. For a count of two, FileMaker Pro duplicates the first record fourteen times and duplicates the second record fourteen times, sorts the records by name so the records would be properly placed together, and then populates the template. For a count of three, each record is duplicated nine times, then sorted by name so the records would be properly placed together when populating the template. A count of four would result in duplication the each of the four records six times, and creation of two dummy records.

Similarly, a count of five would duplicate the first five records five times. A count of six would duplicate the first six records four times. A count of seven would duplicate the first seven records three times each then create two dummy records. A count of eight would duplicate the first eight records two times each then create six dummy records. A count of nine would duplicate the first nine records two times each then create three dummy records. A count of ten would duplicate the first ten records two times each. A count of eleven would duplicate the first eleven records one time each then create eight dummy records. A count of twelve would duplicate the first twelve records one time each then create six dummy records. A count of thirteen would duplicate the first thirteen records one time each then create four dummy records. A count of fourteen would duplicate the first fourteen records one time each then create two dummy records. A count of fifteen would duplicate the first fifteen records one time each. If the number of sets is greater then fifteen but less than thirty, one dummy record is created to fill up the production plate. The Template Format Scripts programming creates a production fail-safe system in that an order will not be produced in excess, while production materials such as film, plates, and stock are saved.

In one embodiment of the present invention, the automated typesetting system is interactively coupled with an automated order tracking, billing, shipping, and inventory control system. Such tracking, billing, shipping, and inventory control systems are generally known in the prior art. The interactive relationship between the automated typesetting system and the tracking, billing, shipping, and inventory control system is built based on the transfer of the information from the FileMaker Pro customer database file fields into the appropriate fields of the order tracking system. Therefore, when a new order is processed by the FileMaker Pro database, FileMaker Pro simultaneously communicates with the tracking, billing, shipping, and inventory control system and populates various analogous fields in the tracking, billing, shipping, and inventory control system, such as a customer number (specific for each customer), a shipment due date, and the type of shipping required. In response, the tracking, billing, shipping, and inventory control system then creates and communicates a job ticket number to the FileMaker Pro customer database file where it is stored in a specific field, the indexed text field JobTicket as shown in the FIG. 7 and in the appended unabridged sample Database File Program. A template may also be created with an appropriate text block to hold an order's job number, so the template may be easily identified during production.

Once all found records have been sent to templates for printing, information from fields in a customer's database file is transmitted to the tracking system for inclusion on the job ticket. Such fields, which may be programmed in the customer's Database File Program, include item codes, shipping name, address, phone number and ship method, billing codes, quantity of order, item(s) being ordered, billing information, and any other required data. A preferred embodiment of such an interactive relationship between the automated typesetting system and the tracking system appears in FIG. 16, the Order Tracking, Billing, Shipping, and Inventory Control System Export Script.

While a specific embodiment of the present invention has been shown and described, it is to be understood that numerous changes and modifications may be made therein without departing from the scope, spirit, and intent of the invention as set forth in the appended claims.

We claim:

1. An automated typesetting system used to produce a commercially-printed product according to a customer's corporate identity specifications, comprising:

means for creating, designing, storing, accessing, and updating an electronic graphic template of said product according to said customer's corporate identity specifications;

means for creating, designing, programming, storing, accessing, and updating an electronic database file, wherein said database file is programmed to receive and store populating data used to populate said electronic graphic template and said database file is further programmed with instructions and parameters used to format said populating data on said electronic graphic template according to said customer's corporate identity specifications;

means for inputting said populating data into said database file as database records;

means for automatically populating said populating data into said electronic graphic template; and means for automatically formatting said populating data on said electronic graphic template according to said customer's corporate identity specifications to form a populated and formatted template.

2. The automated typesetting system of claim 1 further comprising a means for automatically producing production-ready output using said populated and formatted template to produce said commercially-printed product.

3. The automated typesetting system of claim 1 or 2, in which said electronic graphic template is comprised of at least one block designed to contain populating data in the form of text or graphics.

4. The automated typesetting system of claim 1 or 2, in which said database file is comprised of at least one field designed to contain populating data and at least one field designed to contain instructions and parameters used to format said populating data on said electronic graphic template according to said customer's corporate identity specifications.

5. The automated typesetting system of claim 1 or 2, in which said means for creating designing, storing, accessing, and updating said electronic graphic template comprises a computer software program and said means for creating, designing, programming, storing, accessing, and updating said electronic database file comprises a computer software program.

6. The automated typesetting system of claim 1 or 2, in which said means for inputting said populating data into said database file as database records comprises:

a Web site programmed to receive said populating data; and a populating data import means for automatically importing said populating data into said database file as database records.

7. The automated typesetting system of claim 1 or 2 further comprising a means for electronically proofchecking and correcting said populating data prior to automatically populating said populating data into said electronic graphic template.

8. The automated typesetting system of claim 1 or 2, in which said means for automatically populating said populating data into said electronic graphic template further comprises a means for fully populating said electronic graphic template should said populating data not fully populate said electronic graphic template.

9. The automated typesetting system of claim 1 or 2 interactively coupled with an automated order tracking, billing, shipping, and inventory control system.

* * * * *